US010230567B2

(12) United States Patent
Tripathi et al.

(10) Patent No.: US 10,230,567 B2
(45) Date of Patent: Mar. 12, 2019

(54) MANAGEMENT OF A PLURALITY OF SYSTEM CONTROL NETWORKS

(71) Applicant: Dell Products L.P., Round Rock, TX (US)

(72) Inventors: Prabhat D. Tripathi, Milpitas, CA (US); Ivan Ulianov, Daly City, CA (US); Yao Lu, Palo Alto, CA (US); Ferdinand Silva, San Jose, CA (US); Vandhana Narayanan, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 734 days.

(21) Appl. No.: 13/854,628

(22) Filed: Apr. 1, 2013

(65) Prior Publication Data

US 2014/0297834 A1 Oct. 2, 2014

(51) Int. Cl.
*G06F 3/06* (2006.01)
*G06F 8/61* (2018.01)
*H04L 12/24* (2006.01)
*H04L 29/08* (2006.01)

(52) U.S. Cl.
CPC .......... *H04L 41/044* (2013.01); *G06F 3/0605* (2013.01); *G06F 3/067* (2013.01); *G06F 3/0634* (2013.01); *G06F 3/0647* (2013.01); *G06F 3/0653* (2013.01); *G06F 8/63* (2013.01); *H04L 67/1097* (2013.01); *H04L 41/0663* (2013.01); *H04L 41/085* (2013.01); *H04L 41/22* (2013.01)

(58) Field of Classification Search
CPC ................. H04L 41/044; H04L 41/04; H04L 41/042–41/046; H04L 41/082–41/084; H04L 41/0803–41/0846
See application file for complete search history.

(56) References Cited

U.S. PATENT DOCUMENTS 5,261,044 A * 11/1993 Dev et al. ...................... 715/855
5,651,006 A * 7/1997 Fujino et al. .................. 370/408
5,742,762 A * 4/1998 Scholl et al. .................. 709/200
(Continued)

FOREIGN PATENT DOCUMENTS

CN 102629941 A * 8/2012

*Primary Examiner* — Tonia L Dollinger
*Assistant Examiner* — Albert Chiou
(74) *Attorney, Agent, or Firm* — Haynes and Boone, LLP

(57) ABSTRACT

A multiple storage control network management system includes a plurality of controllers, each coupled to a respective system control network to provide a respective controller environment. A controller manager is coupled to each of the plurality of controllers. The controller manager is operable to monitor the respective controller environment provided by each of the plurality of controllers. The controller manager is also operable to move personas between respective controller environments. The controller manager is also operable to start and stop personas across a plurality of the respective controller environments. The controller manager is also operable to receive a first change object from a first controller of the plurality of controllers, compare the first change object to a previously received change object from the first controller, determine the changes between object elements in the first change object and the previously received change object, and store the determined changes.

17 Claims, 35 Drawing Sheets

(56) References Cited

U.S. PATENT DOCUMENTS

| | | | |
|---|---|---|---|
| 5,991,765 A * | 11/1999 | Vethe | |
| 6,324,677 B1 | 11/2001 | Fischer et al. | |
| 7,000,014 B2 | 2/2006 | Poisson et al. | |
| 7,181,519 B2 | 2/2007 | Pillai et al. | |
| 7,257,811 B2 * | 8/2007 | Hunt | G06F 9/4856 707/999.2 |
| 2005/0198631 A1 * | 9/2005 | Bisher et al. | 717/178 |
| 2005/0235058 A1 | 10/2005 | Rackus et al. | |
| 2006/0184937 A1 * | 8/2006 | Abels | G06F 8/65 718/1 |
| 2006/0265701 A1 * | 11/2006 | Raley | G06F 8/60 717/168 |
| 2007/0027973 A1 * | 2/2007 | Stein | H04L 41/0869 709/223 |
| 2009/0021108 A1 | 1/2009 | Owaki et al. | |
| 2014/0019621 A1 * | 1/2014 | Khan | G06F 9/4856 709/226 |

\* cited by examiner

QUERY DLS SYNTAX 700

[SELECT <attributes list>] FROM <ObjectType> [AS <id>] [JOIN <ObjectType> [AS <id>] [ON <conditions>]]* [WHERE <conditions>]

<attributes list> -> comma seperated list of attributes defines in the web service contract.
<ObjectType>      -> managed objects defined in the webservice contract
<conditions>      -> <id_or_string> <operator> <id_or_string> [<logical operator> <conditions>]*
<id_or_string>    -> <id>[.<field>]* | "[^"]*" | '[^']*' | true | false | <number>
<operator>        -> = | != | <> | < | <= | > | >= | Equals | NotEquals | Contains | StartsWith | EndsWith | RegexpMatch
<logical operator> -> AND | OR | && | ||

QUERY DSL EXAMPLES 702

1. FROM PERSONA WHERE state Equals 'BOOTING'

2. SELECT p.id FROM Persona AS p JOIN NetworkConnection AS nc ON p.networkConnections CONTAINS nc WHERE nc.name = 'blah'

MANAGEMENT OF A PLURALITY OF SYSTEM CONTROL NETWORKS

BACKGROUND

The present disclosure relates generally to information handling systems, and more particularly to the management of a plurality of system control networks each including information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A system control network may be made up of one or more servers, switches, and/or other IHSs. System control networks may be managed by a controller such as, for example, an Advanced Infrastructure Manager (AIM) controller available from Dell Inc., of Round Rock, Tex. A conventional AIM controller manages a system control network to provide an "AIM controller environment" within which the AIM controller may discover new servers and their capabilities, communicate status and configuration changes between the AIM controller and personas or virtual machines used in the AIM environment, connect servers to network storage devices that store the personas and virtual machine boot images, and/or to manage other aspects of how personas are configured, connected to virtual networks, provided on IHSs, etc.

Conventional system control networks have a scalability limit such that they cannot be scaled beyond a maximum data center size. However, service providers typically provide a plurality of system control networks that may be shared among their users. Each of those system control networks requires a respective AIM controller to provide a respective AIM controller environment, which can result in the need for hundreds of AIM controllers. Because each system control network/AIM controller environment is its own entity and unaware of other system control networks/AIM controller environments, the monitoring and controlling of elements across these disparate system control networks/AIM controller environments is done manually by an administrator, which is error prone and an inefficient use of the administrators time.

Accordingly, it would be desirable to provide an improved system for managing a plurality of system control networks.

SUMMARY

According to one embodiment, a multiple storage control network management system includes a persona storage device storing a plurality of personas; a plurality of controllers coupled to the persona storage device, wherein each the plurality of controllers is coupled to a respective system control network to provide a respective controller environment, and wherein each system control network includes at least one information handling system (IHS) that is operable to run a persona from the persona storage device; and a controller manager coupled to the persona storage device and each of the plurality of controllers, wherein the controller manager is operable to: monitor the respective controller environment provided by each of the plurality of controllers; move personas from a first respective controller environment provided by a first controller of the plurality of controllers to a second respective controller environment provided by a second controller of the plurality of controllers; start and stop personas across a plurality of the respective controller environments provided by the plurality of the controllers; and receive a first change object from a first controller of the plurality of controllers, compare the first change object to a previously received change object from the first controller, determine the changes between object elements in the first change object and the previously received change object, and store the determined changes.

BRIEF DESCRIPTION OF THE DRAWINGS

FIG. 7 is a view illustrating an embodiment of query DSL syntax and a query DSL example.

FIG. 21 is a screen shot illustrating an embodiment of a personas inventory screen provided by a controller manager.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
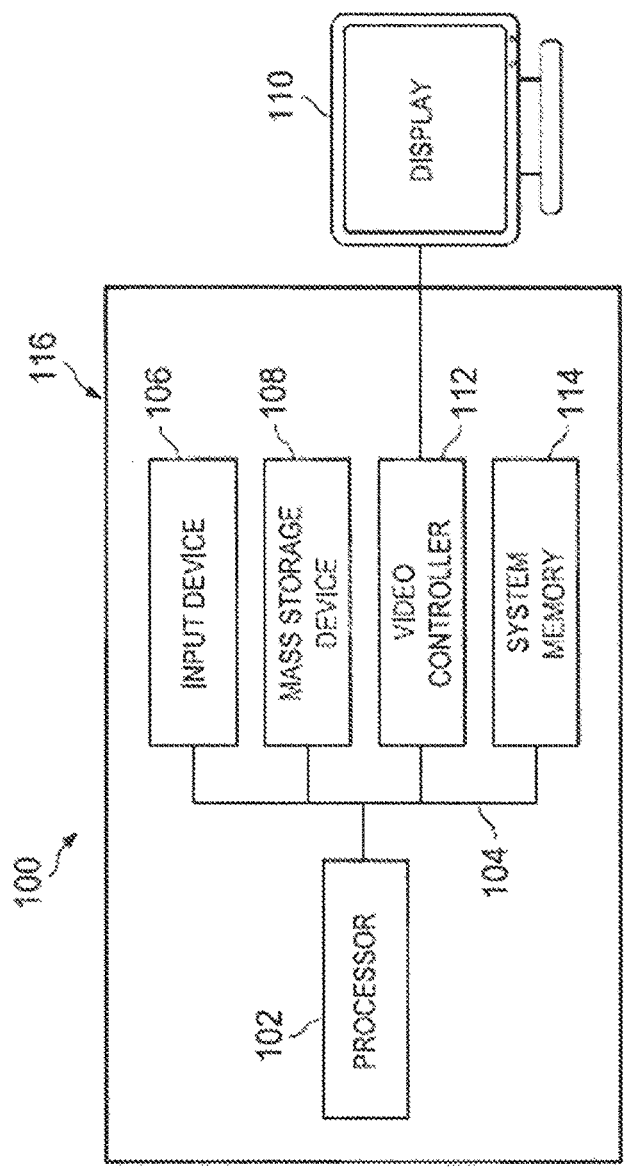
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
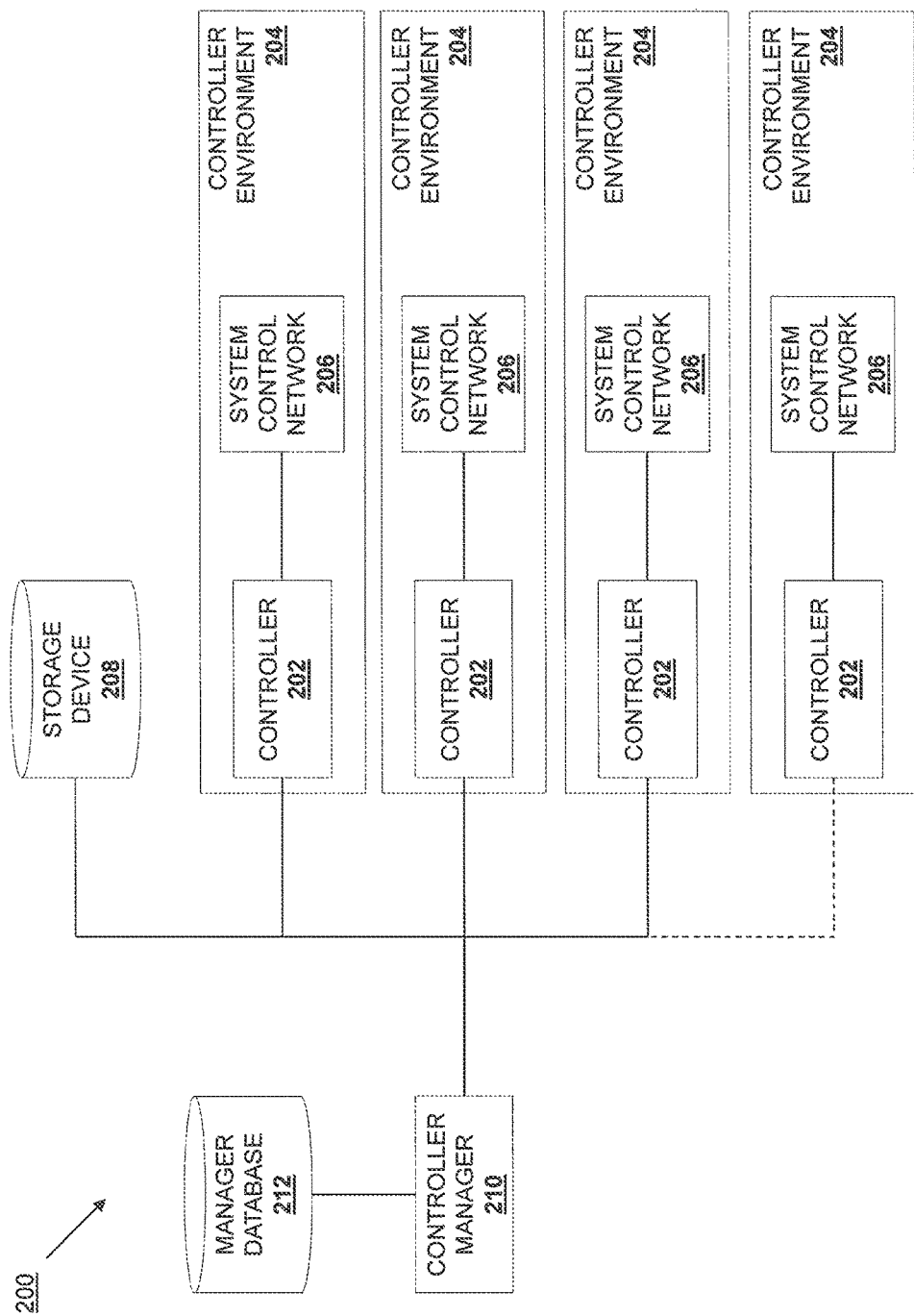
FIG. 2 is a schematic view illustrating an embodiment of a multiple system control network management system.

Referring now to FIG. 2, an embodiment of a multiple system control network management system 200 is illustrated. The system 200 includes a plurality of controllers 202, with each controller 202 providing a controller environment 204 that includes a respective system control network 206 coupled to the controller 202. In one example, each of the controllers may be, for example, an Advanced Infrastructure Manager (AIM) controller available from Dell, Inc., of Round Rock, Tex., and each AIM controller may be operable to provide a respective AIM controller environment that includes a respective system control network. A system control network may include a network of a plurality of server IHSs that are each operated to run fully-functional bootable images called personas that are provisioned to the server IHSs by their AIM controller. An AIM controller will typically define the boundaries of its AIM controller environment by its system control network. An AIM controller can discover new server IHSs and their capabilities, communicate status and configuration changes between itself and personas or virtual machines, connect server IHSs with network storage devices that store persons and virtual machine boot images, and manage a variety of aspects of how personas are configured and connected to virtual networks. The controllers 202 may be provided on an administrator IHS or console that is coupled to a respective system control network.

In an embodiment, the controller 202 is operable to centrally manage a multitude of heterogeneous servers, storage devices and networks in its respective system control network 206. In one embodiment, the controller 202 is an information handling system similar to IHS 100 with software configured to manage and monitor its respective system control network 204. In general, the controller 202 is operable to automatically distribute workloads and applications between host IHSs in its respective system control network 206 in response to user demand. More specifically, rather than a network administrator having to manually install an operating system (OS) image and applications on each host IHS in its respective system control network 206, the controller 202 is configured to choose an appropriate host IHS for a workload and automatically install or boot and configure an OS image and applications on the host IHS. This is accomplished by logically separating the host software from the host hardware. In this regard, the controller 202 manages a plurality of software images, called personas, that may include (among other things) an OS image, applications installed in the OS, and configuration metadata such as network configuration attributes. In some instances, personas may be simply referred to as operating system images even though they may contain an OS image, applications, configuration metadata, etc. These personas (or operating system images) may be booted on any suitable host IHS in a system control network 206.

Each controller 202 is coupled to a storage device 208 (which, while not illustrated as such in FIG. 2, may in some embodiments be considered part of each controller environment 204) to store and replicate these personas. In the illustrated embodiment, the storage device 210 is a central storage repository such as a Fibre Channel storage area network (SAN), iSCSI target, or network-attached storage (NAS). Additionally, controllers 202 may store and continually update an inventory of all managed host IHSs in their respective storage control networks. The inventory includes bare metal hosts configured to boot operating system images directly on host hardware (i.e. in a "bare metal" configuration) and also includes virtualization hosts configured to boot one or more operating system images in a virtual machine. When a controller 202 receives a request to boot a specific persona, the controller is operable to automatically select a bare metal host or a virtual machine on a virtualization host in which to boot the persona. The controller 202 may select a host IHS in part on the network connectivity requirements of the persona. In some embodiments, a user may impose additional selection criteria to which the selected host IHS must conform. Further, after a bare metal host or virtual machine has been selected for a persona, the controller 202 may boot the persona on the host IHS or virtual machine and automatically configure the host IHS according to the requirements of the persona.

A controller manager 210 is coupled to each of the controllers 202. As discussed in further detail below, the controller manager 210 is operable to monitor and control each of the plurality of controllers 202, their respective controller environments 204, and their respective system control networks 206. The controller manager 210 may be provided on an administrator IHS that is coupled the administrator IHSs or consoles that provide the controllers 202. The controller manager 210 is coupled to the storage device 210 as well as a controller manager database 212. In an embodiment, the storage device 208 may be a network storage device that stores the personas, as well as virtual machines or other images that are provisioned on the server IHSs in the storage control networks 206 by each of the controllers 202.

Figure 3:
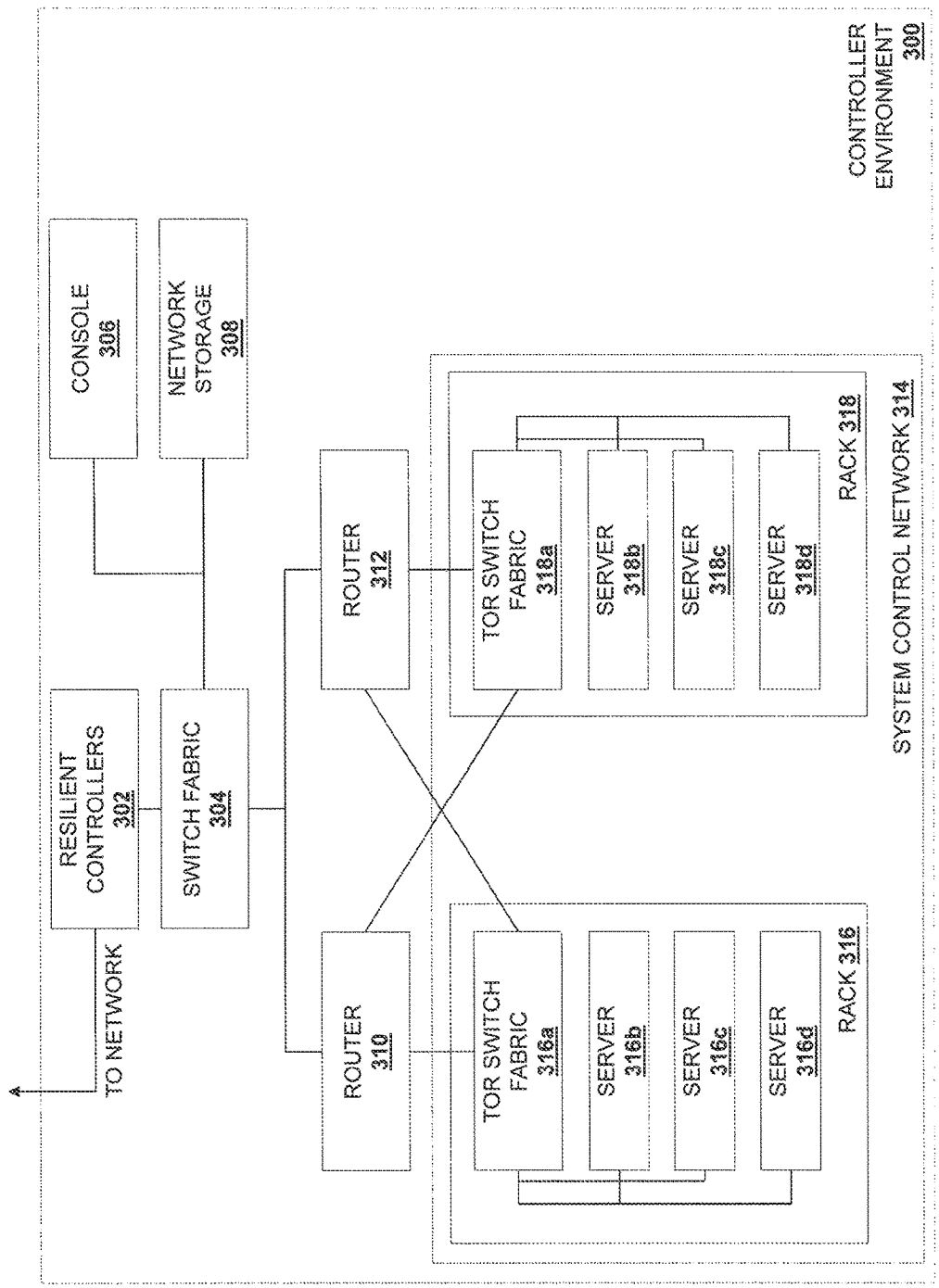
FIG. 3 is a schematic view illustrating an embodiment of a controller environment.

Referring now to FIG. 3, an embodiment of a controller environment 300, which may be any of the controller environments 204 discussed above with reference to FIG. 2, is illustrated. As can be seen in the embodiment illustrated in FIG. 3, the controller environment 300 is coupled to a plurality of resilient controllers 302, any of which may provide a controller 202 discussed above with reference to FIG. 2 (and the others of which may provide that controller 202 if the primary controller fails.) The resilient controllers 302 are coupled to a switch fabric 304 which may include, for example, one or more switch IHSs known in the art. The switch fabric 304 is coupled to a console 306 through, for example, a network operations center (NOC) network. In an embodiment, the console 306 may be a management console that includes the controller manager 210 discussed above with reference to FIG. 2. The switch fabric 304 is also coupled to a network storage 308 (e.g., a network attached storage (NAS)) through a storage network. A plurality of routers 310 and 312 are coupled to the switch fabric 304, and may each be coupled to a plurality of application networks which have not been illustrated for clarity of description and illustration.

A system control network 314 within the controller environment 300 includes a plurality of racks 316 and 318. The rack 316 houses a top of rack (TOR) switch fabric 316a that is coupled to a plurality of servers 316b, 316c, and 316d, and the rack 318 houses a top of rack (TOR) switch fabric 318a that is coupled to a plurality of servers 318b, 318c, and 318d. In an embodiment, each TOR switch fabric 316a and 318a may include one or more switches known in the art. Each of the routers 310 and 312 may be coupled to both of the TOR switch fabrics 316a and 318a. For example, the router 310 may be coupled through a switch management network to unmanaged ports on managed switches in the TOR switch fabric 316a, as well as directly to external ports on managed switches in each the TOR switch fabrics 316a and 318a (e.g., using link aggregation/teaming between multiple ports on the router 310 and the managed switches), and the router 312 may be coupled through a switch management network to unmanaged ports on managed switches in the TOR switch fabric 318a, as well as directly to external ports on managed switches in each the TOR switch fabrics 316a and 318a (e.g., using link aggregation/teaming between multiple ports on the router 312 and the managed switches). Furthermore, the router 310 may be coupled through a management network to each of the servers 316a, 316b, and 316c, and the router 312 may be coupled through a management network to each of the servers 318a, 318b, and 318c.

The controller environment 300 is an example of a typical controller/system control network deployment topology, with the resilient controllers 302 including two controllers connected to a network that is independent of the controller environment 300, as well as to two physical racks 316 and 318 through a pair of data center routers 310 and 312 that are not managed by the resilient controllers 302. Each of the physical racks 316 and 318 includes two TOR switches (that make up the TOR switch fabrics 316a and 318a) and three managed servers (316b, 316c, 316c; or 318a, 318b, 318c). The managed servers may run applications such as, for example, Exchange server available from Microsoft® Inc., SQL Server database server available from available from Microsoft® Inc., and Siebel application server available from Oracle® Inc.

Each TOR switch in the TOR switch fabric 316a and 318a has several server ports for connecting to managed servers, and the server ports may be assigned to two different channels. For example, the server ports of one TOR switch in each rack 316 and 318 may be assigned to one channel, while the server ports in the other TOR switch in each rack 316 and 318 may be assigned to another channel. Each server in each rack 316 and 318 may have two Network Interface Controllers (NICs), with one NIC connected to one TOR switch and the other NIC connected to the same-numbered port on the other TOR switch, thus connected each server to both channels. Each TOR switch may include several sets of link aggregated ports that connect that TOR switch to both data center routers 310 and 312, and these external connections may be used to transmit all Virtual Local Area Network (VLAN) traffic from the controller environment 300 to the routers 310 and 312, including any of the system control network 314 VLAN traffic. The data center routers 310 and 312 are configured to transmit all VLAN traffic between the racks 316 and 318, as well as to transmit traffic between TOR switches and the network connected to the resilient controllers 302. The data center routers 316 and 318 are further configured with helper functions to transmit some broadcast traffic from the system control network 314 to the resilient controllers 302.

Each of the TOR switches in the racks 316 and 318 may include unmanaged ports (e.g., unmanaged by the controllers 302) and, as discussed above, one of those unmanaged ports on each TOR switch may be used to connect the TOR switch management address to dedicated switch management networks in the data center. Each server in the racks 316 and 318 include dedicated management module ports that are connected to management networks (e.g., "lights out" management networks), one for each rack 316 and 318, that are outside the controller environment 300. The controllers 302 use this connection to monitor and control the power of the servers, and the routers 310 and 312 are configured to transmit traffic between the management networks and the controllers 302.

The two resilient controllers 302 are each connected, via a pair of teaming NICs, to a dedicated network which is in its own broadcast domain. Each resilient controller 302 has a real Internet Protocol (IP) address configured in its operating system on that network, allowing access to the servers in the racks 316 and 318 even when that controller is not running. The routers 310 and 312 are configured to transmit traffic between the controller servers address on the resilient controllers 302 and the networks that include the racks 316 and 318, the server management modules, managed switches, the console 306, and the network storage 308 for persona and VMRack images. The routers 310 and 312 are also configured to transmit some broadcast traffic from the system control network to the resilient controllers 302.

As discussed above, the resilient controllers 302 are operable to assign persona addresses on the networks that include the racks 316 and 318 when they boot, allowing the resilient controllers 302 to control their associated personas. The routers 310 and 312 will then transmit traffic between the resilient controllers 302 and the system control network 314, while also forwarding some broadcast traffic from the storage control network 314 to the controller server address.

Figure 4:
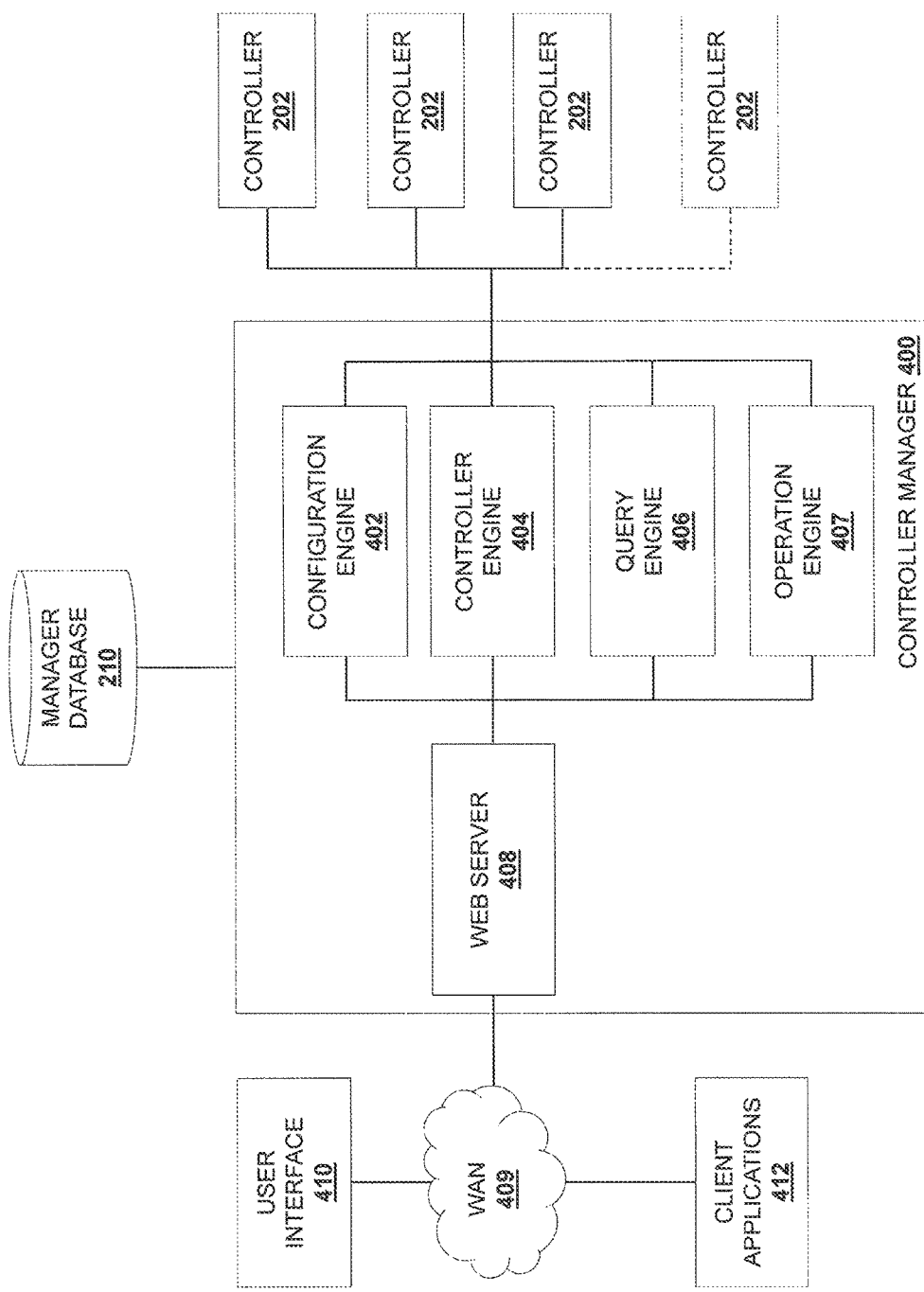
FIG. 4 is a schematic view illustrating an embodiment of a controller manager.

Referring now to FIG. 4, an embodiment of a controller manager 400, which may be the controller manager 210 discussed above with reference to FIG. 2, is illustrated. As can be seen in the embodiment illustrated in FIG. 4, the controller manager 400 is coupled to the plurality of controllers 202 and the controller manager database 212. The controller manager includes a memory system that stores instruction that, when executed by a processing system in the controller manager, cause the processing system to provide a plurality of engines, discussed below, that perform the functions of the controller manager as detailed below. For example, the controller manager 400 includes a configuration engine 402 that is operable to keep track of changes in the configurations or states of the managed controllers 202.

Figure 15:
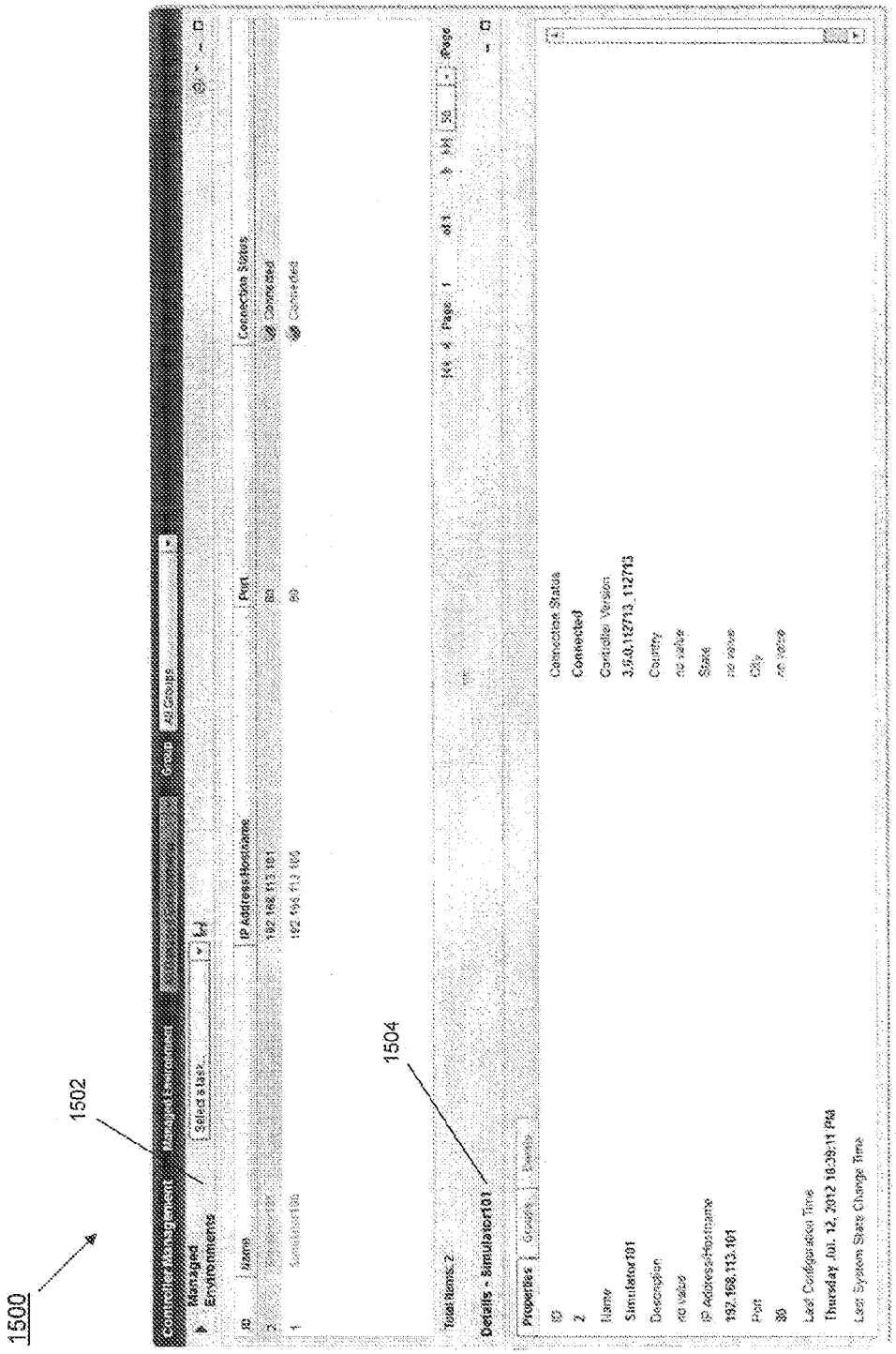
FIG. 15 is a screen shot illustrating an embodiment of a controller management screen provided by a controller manager.

The controller manager 400 also includes a controller engine 404 that is operable to "onboard" a new controller 202 (i.e., bringing a controller 202 that has been recently connected to the controller manager under the management of that controller manager; e.g., see FIG. 15 for screenshot illustrating a pair of controllers Simulator 101 and Simulator 106 under management), and keep track of the health of all managed controllers 202 (e.g., via a periodic heartbeat). In situations where resilient controllers are provided (e.g., one active controller and one standby controller) and the active controller goes down, the controller engine 404 is operable to cause the controller manager 400 to connect to the standby controller. In the event that one of the managed controllers 202 and its system control network goes down, discussed in further detail below with reference to the method 500, the controller engine 404 is operable to initiate disaster recovery in collaboration with the operation engine 407 (discussed below) such that all personas under the affected controller are moved to a system control network coupled to a different controller 202. Disaster recovery may be initiated in response to a physical disaster such as a power outage, a flood, or other systemic failure at a data center. Because all the persons are stored in a network storage (e.g., the network storage 208 or 308 discussed above) the controller manager 400 can safely move personas without significant operational disturbances.

The controller manager 400 also includes a query engine 406 that is operable to receive and execute queries sent to the controller manager 400, as discussed in further detail below. The controller manager 400 also includes an operation engine 407 that is operable to start and stop personas on one or more system control networks, as well as re-deploy personas from one system control network to another system control network in the event of a disaster. Each of the configuration engine 402, the control engine 404, the query engine 406, and the operation engine 407 is coupled to each of the controllers 202. A web server 408 is coupled to each of the configuration engine 402, the control engine 404, the query engine 406, and the operation engine 407, to retrieve information collected from the controllers 202 and provide that information through a network (e.g., a Wide Area Network (WAN)) 409 to a user through a user interface 410 and/or through client applications 412.

Figure 5:
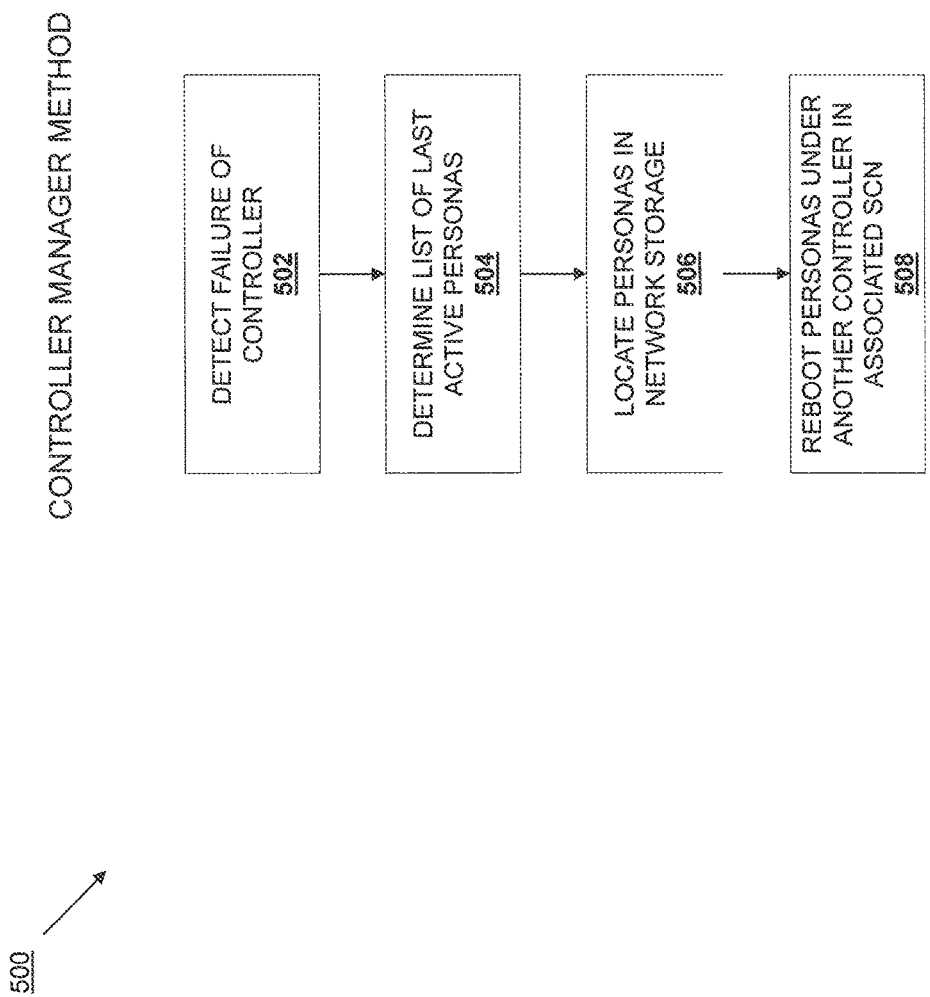
FIG. 5 is a flow chart illustrating an embodiment of a method of controller manager operation.

Referring now to FIG. 5, a method 500 for managing controllers in the event of a controller failure is illustrated. The method 500 begins at block 502 where the failure of a controller is detected. In an embodiment, the controller engine 404 in the controller manager 400 may automatically detect a failure of one of the controllers 202 through, for example, periodic health checks. The method 500 will then proceed to block 504 where a list of last active personas is determined. In an embodiment, the controller engine 404 will retrieve (e.g., from the manager database 210) the most recent list of active personas that were running on the system control network of the controller that is associated with the detected failure at block 502, and send that list to the operation engine 407. The method 500 then proceeds to block 506 where personas are located in the network storage. In an embodiment, the operation engine 407 uses the most recent list of active personas received at block 504 to locate personas in the network storage (e.g., the storage 208 or 308 discussed above) that correspond to the most recent personas that were running on the system control network of the controller that is associated with the detected failure at block 502. The method 500 then proceeds to block 508 where personas are rebooted under another controller in its associated system control network. In an embodiment, the operation engine 407 determines an available controller 202 of the plurality of controllers 202, and reboots each of the personas located in block 506 on the servers in the system control network for that available controller 202.

With reference to FIG. 2, a datacenter administrator may add a new controller environment 204 under the controller manager 210 by adding a new controller 202 under the controller manager 210. If a controller 202 goes down in the case of a non-resilient controller setup (e.g., with no standby controller), or each resilient controller in a controller environment goes down, the controller engine 404 may alert the datacenter administrator about that failure while also retrieving a disaster recovery policy. The controller engine 407 will then operate with the operation engine 407 according to the method 500 above to redeploy all affected personas to another system control network of another controller 202.

Figure 6:
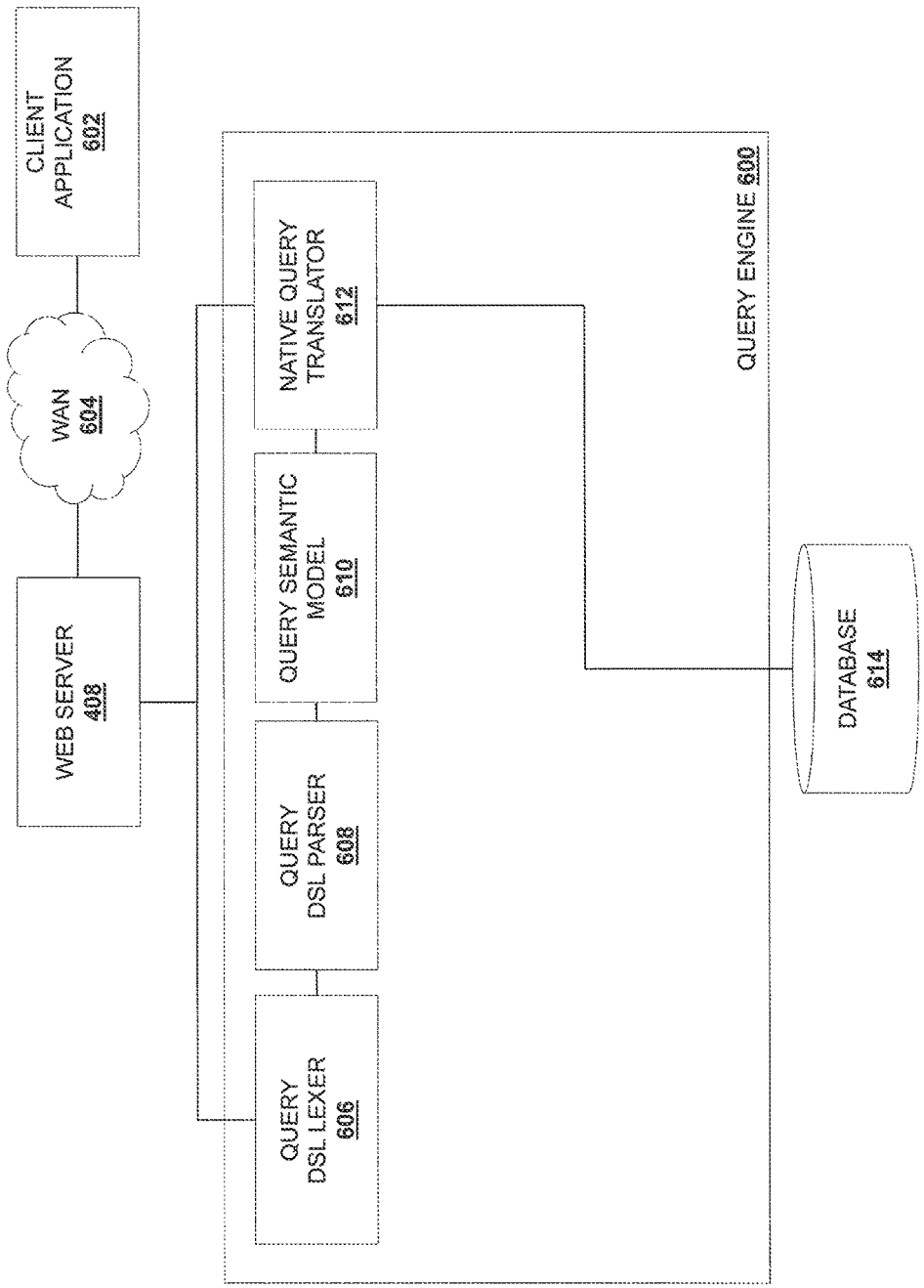
FIG. 6 is a schematic view illustrating an embodiment of a query engine in the controller manager of FIG. 4.

Referring now to FIG. 6, an embodiment of a query engine 600, which may be the query engine 406 discussed above with reference to FIG. 4, is illustrated. As can be seen in the embodiment illustrated in FIG. 6, the query engine 600 is coupled to the web server 408. The web server 408 may be coupled to a client application 602 through a Wide Area Network (WAN) 604, and the web server 408 may be operable to receive query requests from the client application 602 through the WAN 604 and, in response, dispatch a query execution request to the query engine 600. The query engine 500 includes a query Domain Specific Language (DSL) lexer 606 for validating queries received from the web server 408, and a query DSL parser 608 coupled to the query DSL lexer 606 for building a parse tree from a validated query that may be converted into a query semantic model 610. A native query translator 612 is operable to receive the query semantic model 610 and translate the query semantic model 610 into a native query. A database 614 is coupled to the native query translator 612 to allow the native query translator to execute native queries against the database 510 and return a result back through the web server 408 to the client application 602. Examples of queries provided to and executed by the query engine 600 are provided below in FIGS. 25-31.

Referring now to FIG. 7, an embodiment of query DSL syntax 700 and an example of a query DSL are illustrated. The example in FIG. 7 highlights that the query syntax is SQL like, but domain specific. One of skill in the art would recognize that query DSL syntax, such as the example provided in FIG. 7, is flexible and can be used to query any managed domain object while also including their related managed domain objects through the JOIN clause. The list of all domain objects, their attributes, and their interrelationships may be communicated to clients as a contract using some interface description language such as, for example, Web Services Description Language (WSDL) or Web Application Description Language (WADL). The query DSL syntax allows users to create complex queries to run on the system. Each query specifies which objects to retrieve by specifying the ObjectType in the FROM and JOIN clauses, and which attributes of those objects should be retrieved by specifying them in the attribute list. The results can be narrowed by specifying conditions that the attributes must fulfill both with respect to static values passed in through the query itself or with respect to other attributes.

Figure 8:
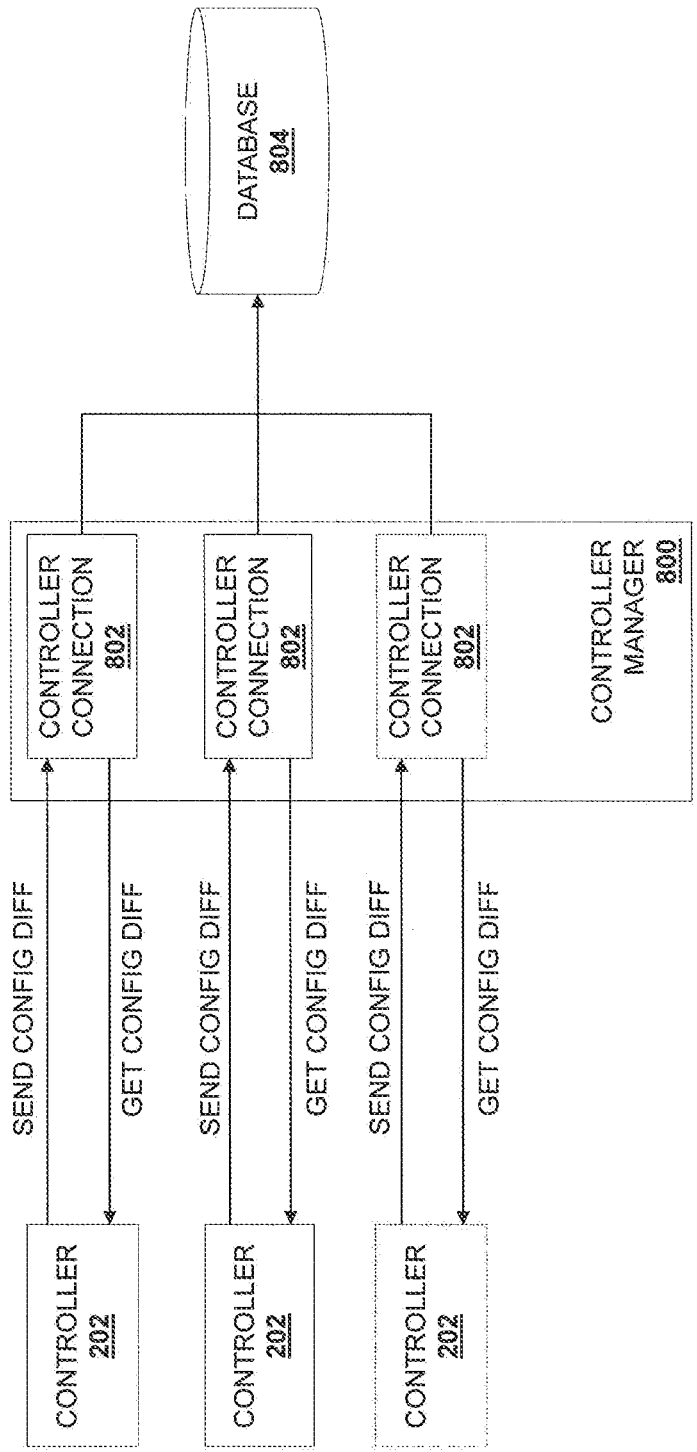
FIG. 8 is a schematic view illustrating an embodiment of controller manager retrieved configuration differences from controllers.

Referring now to FIG. 8, an embodiment of a controller manager 800, which may be the controller manager 208 discussed above with reference to FIG. 2, is illustrated requesting and receiving configuration differences from the controllers 202 that indicate the changes that have occurred subsequent to the receiving of previous configuration differences. In an embodiment, the controller manager 800 is operable to create controller connections 802 for each controller 202 coupled to the controller manager 800, and those controller connections 802 will operate to receive configuration differences when they become available on their respective controller 202. Examples of configuration changes include, for example, object removal (e.g., server IHS or host IHS removal from the system control network), object addition (e.g., server IHS or host IHS added to the system control network), and object modification (e.g., a persona running in the system control network is modified.)

In an embodiment, a configuration differences object ("configDiffObject") may include the following data structure:
Status: Added|Removed|Modified|Unchanged
List<Configuration Diff Object>children In an embodiment, each controller 202 is operable to determine what changes to a controller environment have occurred subsequent to the previous changes were provided to the controller manager 800, and send only those changes (configuration differences) back to the controller connection 802 in the controller manager 800. The data structure above describes those changes and is simple and easy to process while requiring a minimal amount of data to be sent across the network. When configuration differences are received by the controller connections 802 in the controller manager 800, the database 804 is updated to reflect those changes. The data structure above dramatically reduces the traffic between the controller manager, the controllers, and the storage device during, for example, the exchange of data set information.

Changes to the configuration of a controller may include generating internal configuration differences code using a custom utility that reads an XML schema and generates code that compares two configuration objects by reviewing each element in the old configuration object and the new configuration object, and then creating a copy of new elements with an added diffStatus attribute that specifies if the element was added or modified. If the element is removed, then the new element is a copy from the old configuration object.

After the internal configuration differences code is generated, the controller iterates through the internal differences and the new configuration object: if the element from the internal configuration differences has a non-zero diffStatus, the corresponding element from the new configuration differences object is converted and wrapped inside a Configuration diff object. The final list of all configuration differences objects is then sent to the controller manager. These configuration diff objects represent what has changed in the system, and are used to update and refresh the old data in the controller manager database.

Figure 9:
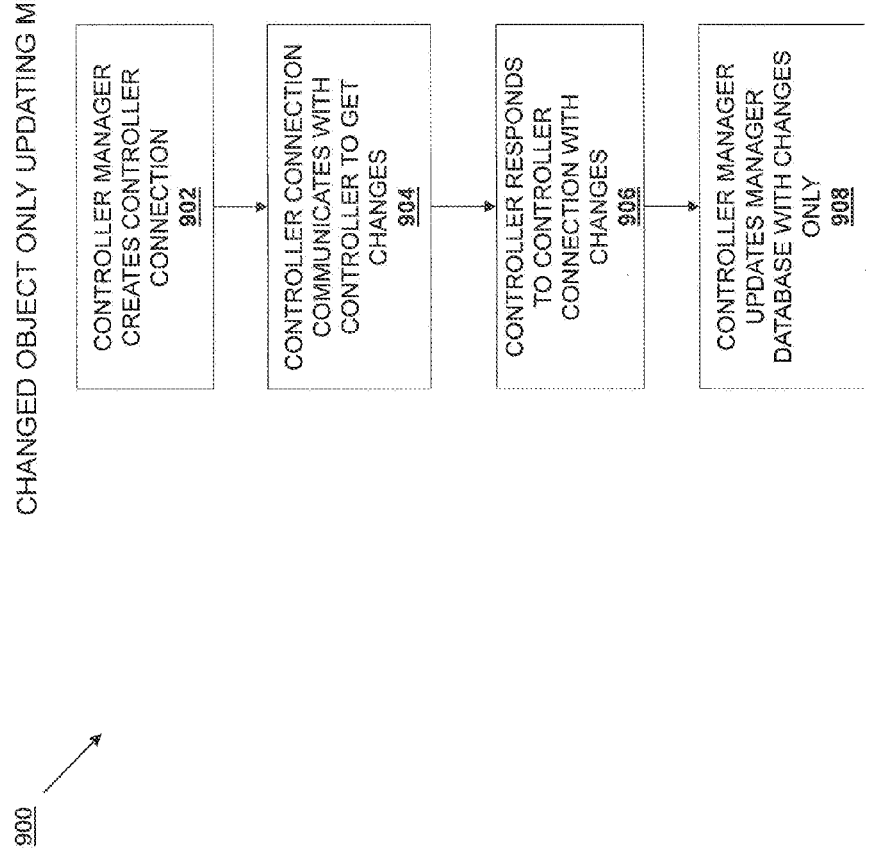
FIG. 9 is a flow chart illustrating an embodiment of a method of the updating of changed objects only.

Referring now to FIG. 9, a method 900 for updating changed objects only is illustrated. The method 900 begins at block 902 where the controller manager 800 creates a controller connection 902. The method 900 then proceeds to block 904 where the controller connection 802 communicates with its associated controller 202 to get change information from that controller 202. The method 900 then proceeds to block 906 where the controller 202 responds to the controller connection 802 with the change information. As discussed above, change information may be encapsulated in a data structure called a configDiffObject. This configDiffObject data structure contains a status which can be one of 'added', 'removed', 'modified', or 'unchanged'. The configDiffObject also contains a list of children, which are also configDiffObjects themselves. The method 900 then proceeds to block 908 where the controller manager 800 receives the configDiffObjects and updates the database with the change information.

Figure 10:
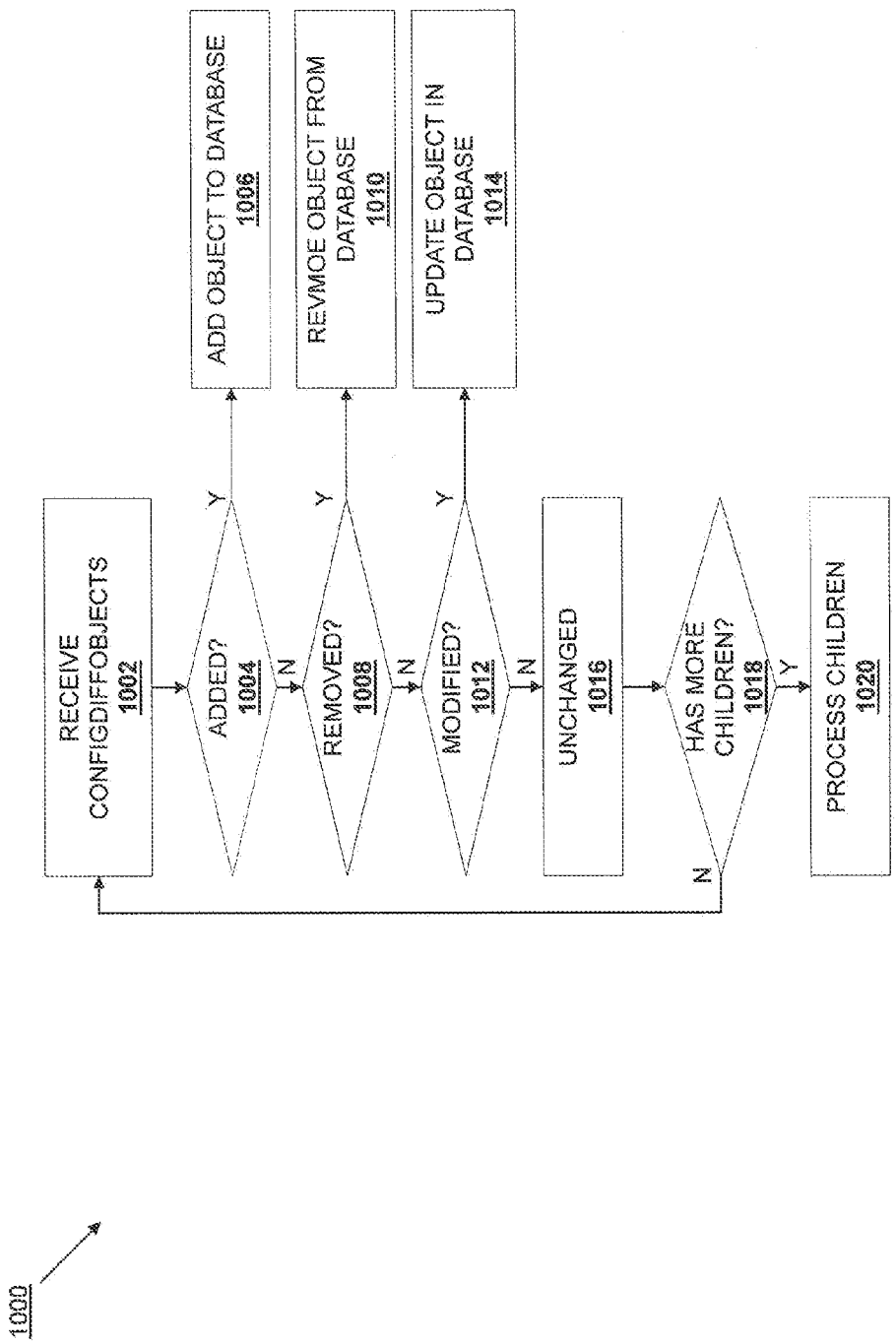
FIG. 10 is a flow chart illustrating an embodiment of a method for updating changed objects only.

Referring now to FIG. 10, an embodiment of a method 1000 for processing a configDiffObject is illustrated. The method 1000 begins at block 1002 where a configDiffObject is received. The method 1000 may be performed for each configDiffObject received from any of the controllers 202, followed the checking of the status of the configDiffObject as discussed below. The method 1000 then proceeds to decision block 1004 where it is determined whether the configDiffObject indicates that an object has been added to a system control network associated with the controller that provided the configDiffObject. If, at decision block 1004, the configDiffObject indicates that an object has been added to the system control network, the method 1000 proceeds to block 1006 where the object is added to the controller manager database. For example, a new switch may have been added to a system control network and, in response, a received configDiffObject will indicate that addition and data representing that switch will be added to the controller manager database. If, at decision block 1004, the configDiffObject indicates that no object has been added to a system control network, the method 1000 proceeds to decision block 1008 where it is determined whether the configDiffObject indicates that an object has been removed from a system control network associated with the controller that provided the configDiffObject. If, at decision block 1008, the configDiffObject indicates that an object has been removed from the system control network, the method 1000 proceeds to block 1010 where the object is removed from the controller manager database. For example, a previously existing host IHS may have been removed from a system control network and, in response, the configDiffObject will indicate that removal and data representing that host IHS will be removed from the controller manager database.

If, at decision block 1008, the configDiffObject indicates that no object has been removed from the system control network, the method 1000 proceeds to decision block 1012 where it is determined whether the configDiffObject indicates that an object has been modified in a system control network associated with the controller the configDiffObject. If, at decision block 1012, the configDiffObject indicates that an object has been modified in the system control network, the method 1000 proceeds to block 1014 where the object is retrieved from the controller manager database, updated, and saved back in the controller manager database. For example, an existing chassis may have been modified by adding two new blade servers and, in response, the configDiffObject will indicate that modification and data representing those new blade servers will be used to update the chassis object in the controller manager database. If, at decision block 1012, the configDiffObject indicates that no object has been modified in the system control network, the method 1000 proceeds to block 1016 where it is determined that the configDiffObject indicates that no object has been changed in the system control network. The method 1000 then proceeds to decision block 1018 where it is determined whether the object associated with the configDiffObject has more children. Even if the object associated with the configDiffObject has no changes, its children many have had some changes. For example, an existing host IHS many not have changed, but the switches inside that existing host may have changed. If, at decision block 1018, the controller manager determines the object has children, the method 1000 proceeds to block 1020 where the controller manager may iterate through the object's children and process each child to determine whether it has changed. If, at decision block 1018, the it is determined that the object has no more children, the method 1000 returns to block 1002 to receive more configDiffObjects.

The method 1000 using configDiffObjects to update a database provides substantial benefits to large databases managed by the controller manager. For example, the controller connections 802 could retrieve all objects from their respective controllers 202, which could include objects representing all chassis, hosts, switches, etc. in the associated system control network. This large amount of data would then be exchanged between the controller 202 and the controller connection 802. Once received, the controller manager 800 would then have to inspect each and every object, compare those objects to the objects in the controller manager database, and determined which objects have been added, removed, or modified. Such an approach is very time consuming.

In an embodiment, the configDiffObjects of the present disclosure are created by a controller configurator in each controller that operates as an internal manager of system configurations, and provided through a controller interface layer between the controller configurator and the controller manager. The configDiffObject creation process begins with a configDiffObject request (getConfigDiff) being received by a controller through the controller interface layer, and includes the configuration version (oldConfigVer) currently held by the controller manager. The controller interface layer determines whether the old configuration is located in a cache and, if not, notifies the controller manager to retrieve the entire configuration by sending the controller manager a null diff (the controller may store the last 100 configurations in the cache.) If the old configuration is in the cache, the controller interface layer will send a request to the controller configurator to create a diff between the oldConfigVersion and the latest configuration.

The controller configurator will create an XML document that contains all of the objects that have changed between the two versions (i.e., the latest configuration and the old configuration discussed above), and each element will have a flag on it stating how the element has changed. The controller configurator iterates through each object in the latest configuration and compares it to the corresponding object in the old configuration. If an object corresponding to an object in the latest configuration is not found in the old configuration, that object is marked as a new object that has been added. If an object is found in the old configuration and the latest configuration, the controller configurator compare the attributes of that object and marks the object as changed if the attributes are different. The configurator then repeats this process for each child element in the object until there are no more children. If any child object was flagged as modified by the aforementioned comparison then the configurator marks all the parent elements with eth childModified flag. Finally, the controller configurator iterates through the objects in the old configuration, and if any are not in the latest configuration, they are added to the diff and marked as deleted.

The controller interface layer will then create a configDiffObject and populate it with all the elements from the computed differences discussed above. In an embodiment, the configDiffObject has a tree data structure where each node is an object that has changed and corresponds with one object in the internal configuration. Each node will contain, in addition to the actual object data, the diff status of the object as well as the merged status of its children. The status of the object can be one of 'unchanged', 'modified', 'added', or 'removed', and is taken directly from the diff made by the controller configurator. The child status is computed by checking the status of each child and setting childModified, childAdded, and childRemoved flags to true if any of the children have "modified", "added", or "removed" as their status. Nodes that have children but that also have the status of "added" or "removed" will have their children trimmed from the configDiffObject since the children will have the same status as their parent. The child data will still be present inside the object data portion of the node. Once created, the configDiffObject is then returned to the controller manager.

Figure 11:
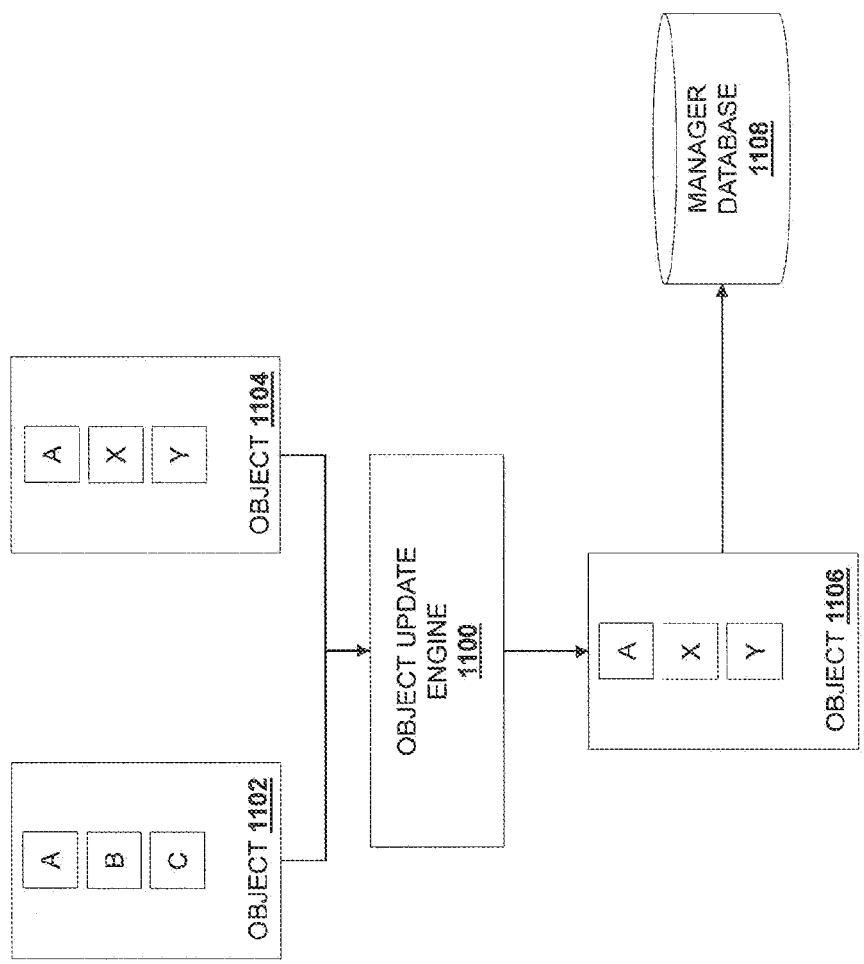
FIG. 11 is a schematic view illustrating an embodiment of the updating of a database object.

Referring now to FIG. 11, an embodiment of an object update engine 1100, which may be provided by the controller manager 208 of FIG. 1, is illustrated. The object update engine 1100 is operable to compare a database object 1102 from a controller 202 that represents old database data and compare it to a database object 1104 from the controller 202 that represents the latest database data, and provide a database object 1106 that represents the old database data updated with the latest data. The database object 1102 includes a hierarchy of object elements A, B, and C. Database object 1102 represents old data from the database of the controller manager (e.g., the data from the last time the controller manager asked the controller to send over the latest data), while database object 1104 includes a hierarchy of object elements A, X, and Y recorded by that controller 202 and currently existing in the database of the controller. The object update engine 1100 compares database objects 1102 and 1104 by traversing their hierarchies of object elements to determine which of the object elements from the database object 1102 have changed, and those changes are applied to object 1106, which is output and saved to the controller manager database 1108.

In an embodiment, the code used by the object update engine 1100 is efficient generic code that works on any Java database object containing any arbitrary data and having any complexity, which provides benefits over conventional software that only works on customer/specific Java database objects.

Figure 12:
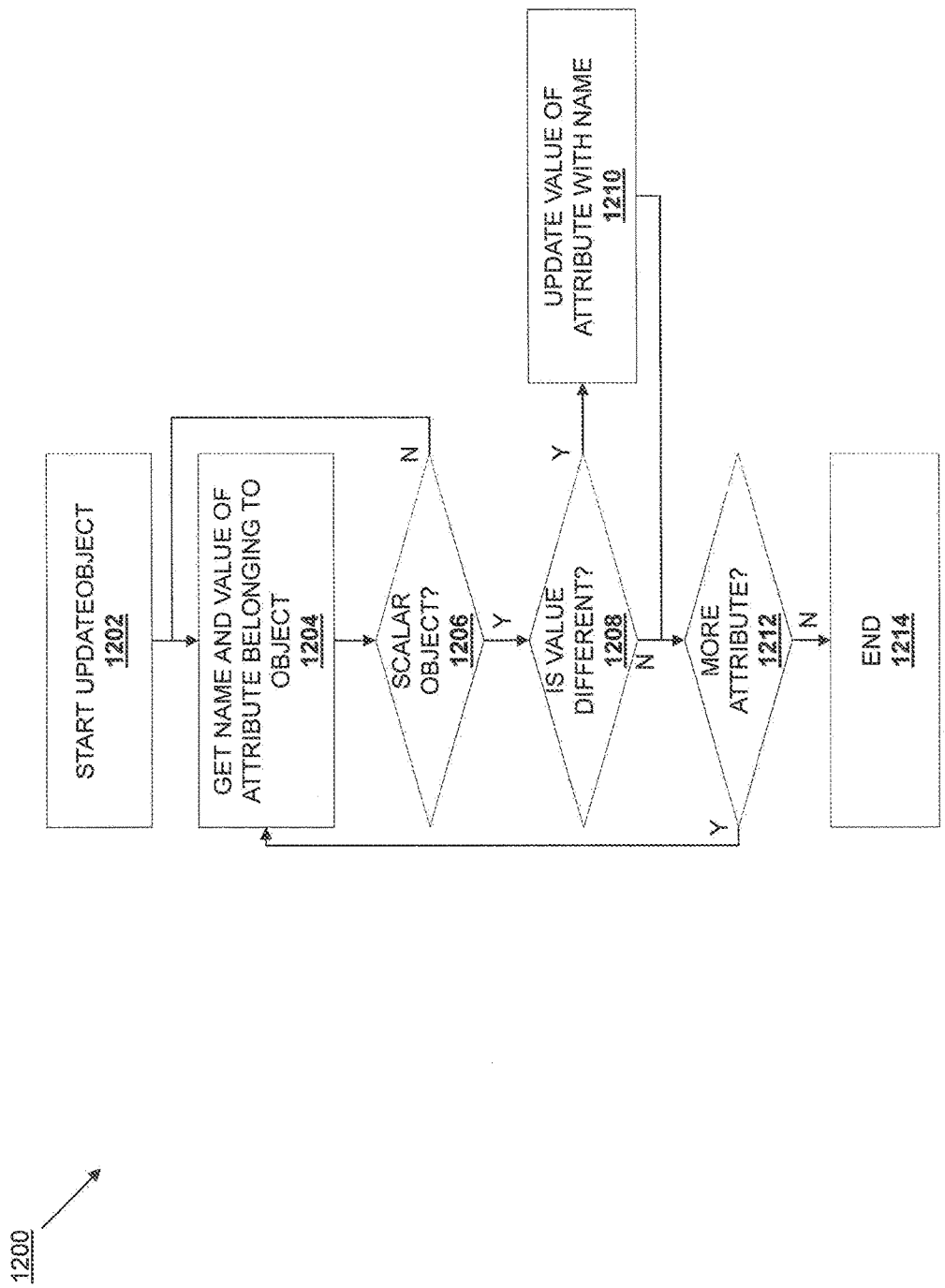
FIG. 12 is a flow chart illustrating an embodiment of a method of the updating of a complete hierarchy of database objects.

Referring now to FIG. 12, a method 1200 used by the object update engine 1100 to update a complete hierarchy of database objects with the latest data is illustrated. The method 1200 may begin at block 1202 when an update algorithm is provided through a utility library method called updateObject. In an embodiment, the updateObject method may include a signature defined as [Object updateObject (Object orgObject, Object newObject). The updateObject method takes two parameters of Object type: the orgObject is the object with old values, and the newObject is the object whose values need to be applied to orgObject. The type of parameters and return value are all generic Objects, meaning that any type of object may be updated, including Config, Persona, ServerPool, etc. The caller of the updateObject method will first retrieve the orgObject from the database (i.e. a database object), pass the orgObject and new Object to the updateObject method, and then save the returned object (orgObject with its complete hierarchal values updated based on newObject) back to the database.

The purpose of the updateObject method is to walk through each and every attribute of the orgObject hierarchy, compare the same attribute from the newObject, and update the original value from newObject if the values are different. Thus, the method 1200 proceeds from the starting of the updateObject method at block 1202 to block 1204 where the name and value of the attribute belonging to the object are retrieved. For example, a Persona object may contain an attribute called SelectedImageId. An original Persona may have SelectedImageId set to 1, while a new Persona may have SelectedImageId set to 3. In order to compare each and every attribute of a Persona object, the required code would include:

```
If (orgObject.getSelectdImageId( ) != newObject.getSelectedImageId
{
orgObject.setSElectdImageId(newObejct.getSelectedImageId)
}
```

To provide such code for many different objects with many different attributes would be inefficient and error prone. Furthermore, if a new object or new attribute is added, the code must be updated and recompiled. However, to achieve the same result without hard coding the name and value of each attribute, Java reflection may be used to return the names and values of all the attributes. This approach saves thousands of lines of code, resulting in a method that is generic, reusable, and easy to maintain.

The SelectedImageId attribute mentioned above is a scalar object, meaning that it is a non-composite value. However, an object could also contain another object that is non-scalar. For example, a Persona may contain a SystemInfo, which is an object that has name, systemId, version, etc. When two Persona objects with SystemInfo are compared, each scalar attribute of their SystemInfo objects must be walked through. Thus, following block 1204, the method 1200 proceeds to decision block 1206 where each and every sub object is iterated through until a scalar attribute is reached. For example, when updating a Persona and the SystemInfo object of Persona is encountered, a call to updateObject is repeated but with orgSystemInfo and newSystemInfo as parameters, and all the attributes of SystemInfo are walked through and compared to return the updated orgSystemInfo (e.g., the determination at decision block 1208 of whether the value of the object is different). If, at decision block 1208, it is determined that the value of the object is different, the method 1200 proceeds to block 1210 where the value of the attribute is updated (e.g., the original Persona is updated based on orgSystemInfo.) After that, or if the value of the object was not different at decision block 1208, the method 1200 proceeds to decision block 1212 to determine whether there are more attributes. If at decision block 1212 there are determined to be more attributes, the method 1200 returns to block 1204 to continue onto the next attribute of Persona. Through this mechanism, the complete hierarchy of Persona object is evaluated and updated. This again saves thousands of lines of code. If, at decision block 1212, it is determined that there are no more attributes, the method ends at block 1214.

The updateObject algorithm also deals with list of attributes. For example, a Persona object can have a list of NetworkConnections. Besides comparing the values of objects that remain on the list, it is also necessary to add an object that is inserted into the new list and remove objects that disappear from the new list. For example, an original Persona may have 3 NetworkConnections, with IDs 1, 2, 3. A new Persona may have 4 NetworkConnections, with IDs 2, 3, 4, 5. The updateObject method will determined that ID 1 has been removed, while IDs 4, 5 are new to the list, and thus be able to return the correct Persona object with an accurate list of NetworkConnections.

In summary, the updateObject method provides utility function that efficiently and accurately updates the complete hierarchy of orgObject based on newObject. The implementation is written in about 100 lines of code that leverages Java reflection and recursion algorithms. This utility method plays a critical role in the controller manager application to keep information in the centralized inventory in sync with various instances of controllers in the system.

Referring now to FIGS. 13-35, a plurality of screen shots are provided to illustrate the management of a plurality of controllers through a controller manager. In an embodiment, the screenshots are application screens provided by a controller manager application running on a controller manager (e.g., through instructions provided on a non-transitory, computer-readable medium on the controller manager that, when expected by a processor on the controller manager, cause the processor to display the applications screens on a display device.) Access to the controller manager application may be realized through a login screen (not illustrated) that allows a user to provide a user name, password, and/or other credentials known in the art.

Figure 13:
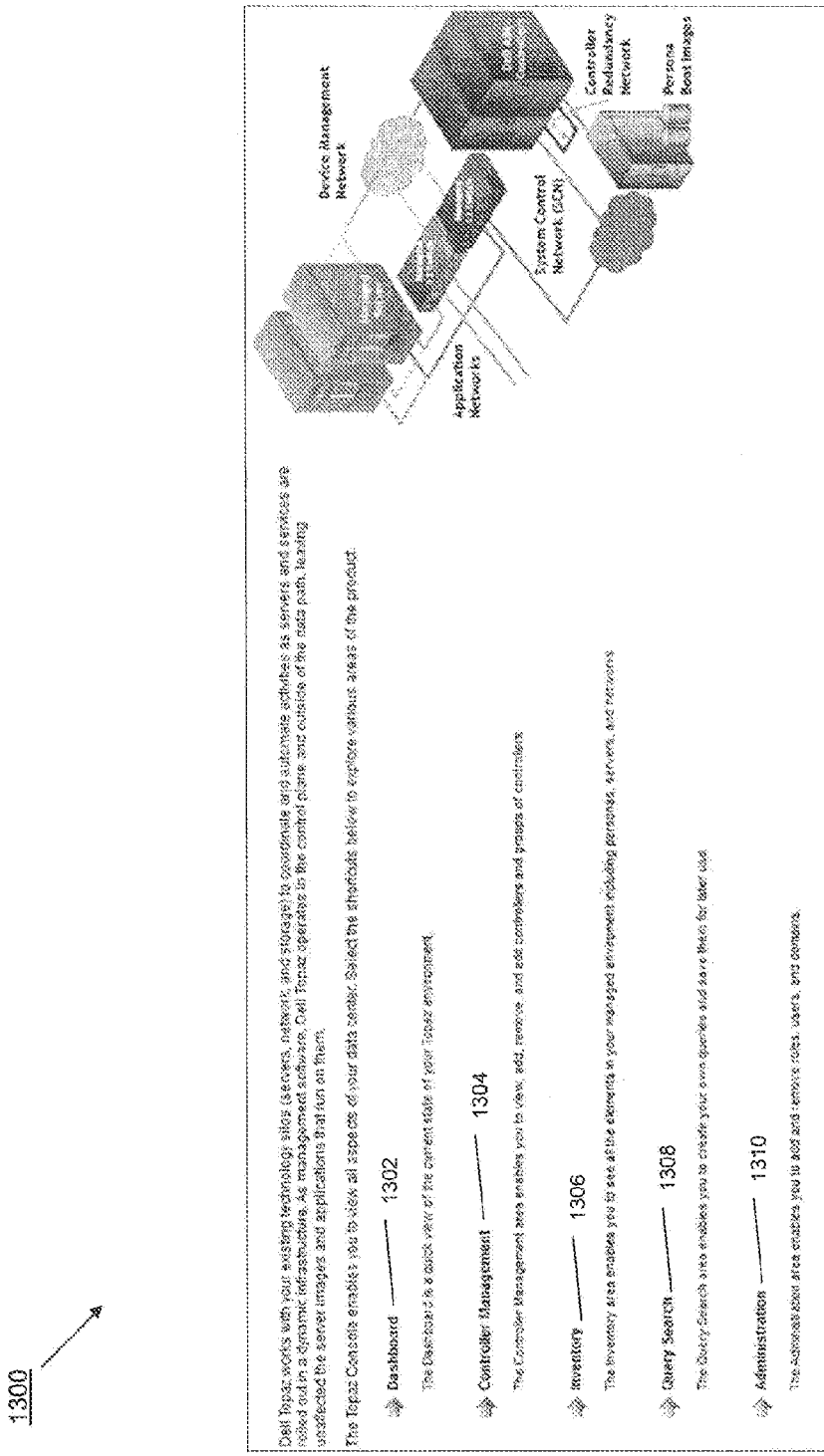
FIG. 13 is a screen shot illustrating an embodiment of a welcome screen provided by a controller manager.

FIG. 13 is an embodiment of a welcome screen 1300 provided by the controller manager application on the controller manager. The welcome screen 1300 describes the functionality of the controller manager application. A dashboard functionality 1302 of the controller manager application allows a user to view the current state of controllers managed by the controller manager. A controller management functionality 1304 allows a user to view, add, remove, and edit controllers and groups of controllers for management by the controller manager. An inventory functionality 1306 allows a user to view all elements of managed controllers, including personas, servers, and networks. A query search functionality 1308 allows a user to create queries and save queries for later user. An administration functionality 1310 allows a user to add and remove roles, users, and domains.

Figure 14:
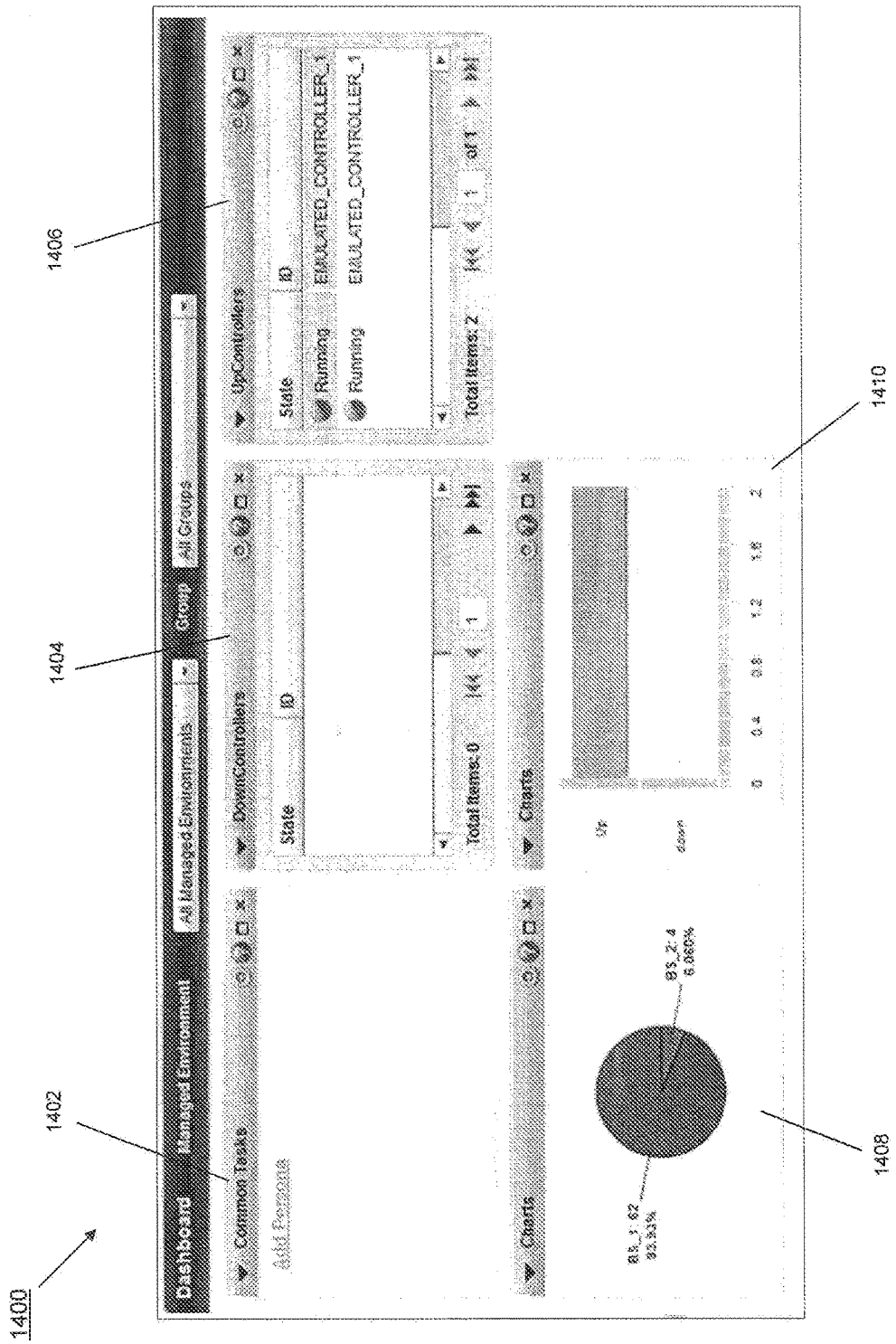
FIG. 14 is a screen shot illustrating an embodiment of a dashboard screen provided by a controller manager.

FIG. 14 is an embodiment of a dashboard screen 1400 provided by the controller manager application on the controller manager according to the dashboard functionality 1302 discussed above with reference to FIG. 13. The dashboard screen 1400 illustrates a plurality of dashboard modules that allow a user of the controller manager application to view the current state of controllers managed by the controller manager. For example, a common task module 1402 provides a link for performing a common task by the controller manager, which is adding a persona in the illustrated embodiment. A down controller module 1404 provides a chart that is operable to list any controllers that are currently down, not operating, or otherwise in need of attention (in the illustrated embodiment, no controllers are currently down.) An up controller module 1406 provides a chart that is operable to list any controllers that are currently up, operating, or otherwise managed by the controller manager (in the illustrated embodiment, only two controllers are currently up, but as discussed above, the controller manager may manage any number of controllers.) A first chart module 1408, which may be user defined, provides a graphical representation of servers that includes "BS" in their name. A second chart module 1410 provides a graphical representation of the current operations of managed controllers. The controller manager application may allow a user to create and add dashboard modules, similar to those illustrated in FIG. 14, to the dashboard screen 1400, while also allowing the removal and/or modification of any current dashboard modules.

FIG. 15 is an embodiment of a controller management screen 1500 provided by the controller manager application on the controller manager according to the controller management functionality 1304 discussed above with reference to FIG. 13. The controller management screen 1500 provides a managed environments section 1502 and a managed environment details 1504 that allow a user of the controller manager application to view, add, remove, and edit controllers and groups of controllers for management by the controller manager. For example, the managed environments section 1502 illustrates a pair of controller environments managed by the controller manager (Simulator 101 and Simulator 106 in the illustrated embodiment) that each have their own IP address and ID. The managed environments section 1502 details a port of the controller manager to which the controllers are connected, along with a connection status of each controller environment. In response to selecting either of the controller environments in the managed environment section 1502, the managed environment details 1504 provides details about that controller environment, as illustrated.

Figure 16:
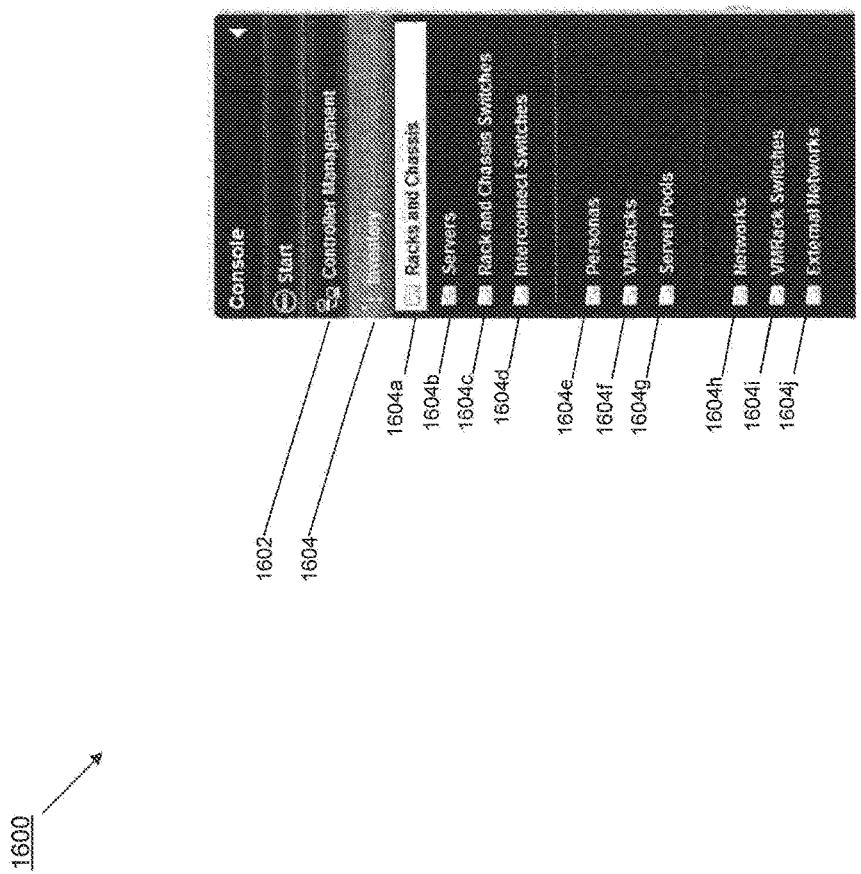
FIG. 16 is a screen shot illustrating an embodiment of a menu provided by a controller manager.

FIG. 16 is an embodiment of a menu 1600 provided by the controller manager application on the controller manager that allows a user to move between the different functionality discussed above with reference to FIG. 13. For example, the menu 1600 includes a controller management link 1602 that may be selected by the user to access the controller management screen 1500, discussed above with reference to FIG. 15. The menu also includes an inventory heading 1604 with links that allow a user to view all elements of managed controllers, including personas, servers, and networks provided by the controller manager application on the controller manager according to the inventory functionality 1306 discussed above with reference to FIG. 13. Under the inventory heading 1604, a user is provided access to a plurality of inventory links, discussed in further detail below, including a racks and chassis link 1604a, a servers link 1604b, a rack and chassis switches link 1604c, an interconnect switches link 1604d, a personas link 1604e, a VMRacks link 1604f, a server pools link 1604g, a networks link 1604h, a VMRacks Switches link 1604i, and an external networks links 1604j.

Figure 17:
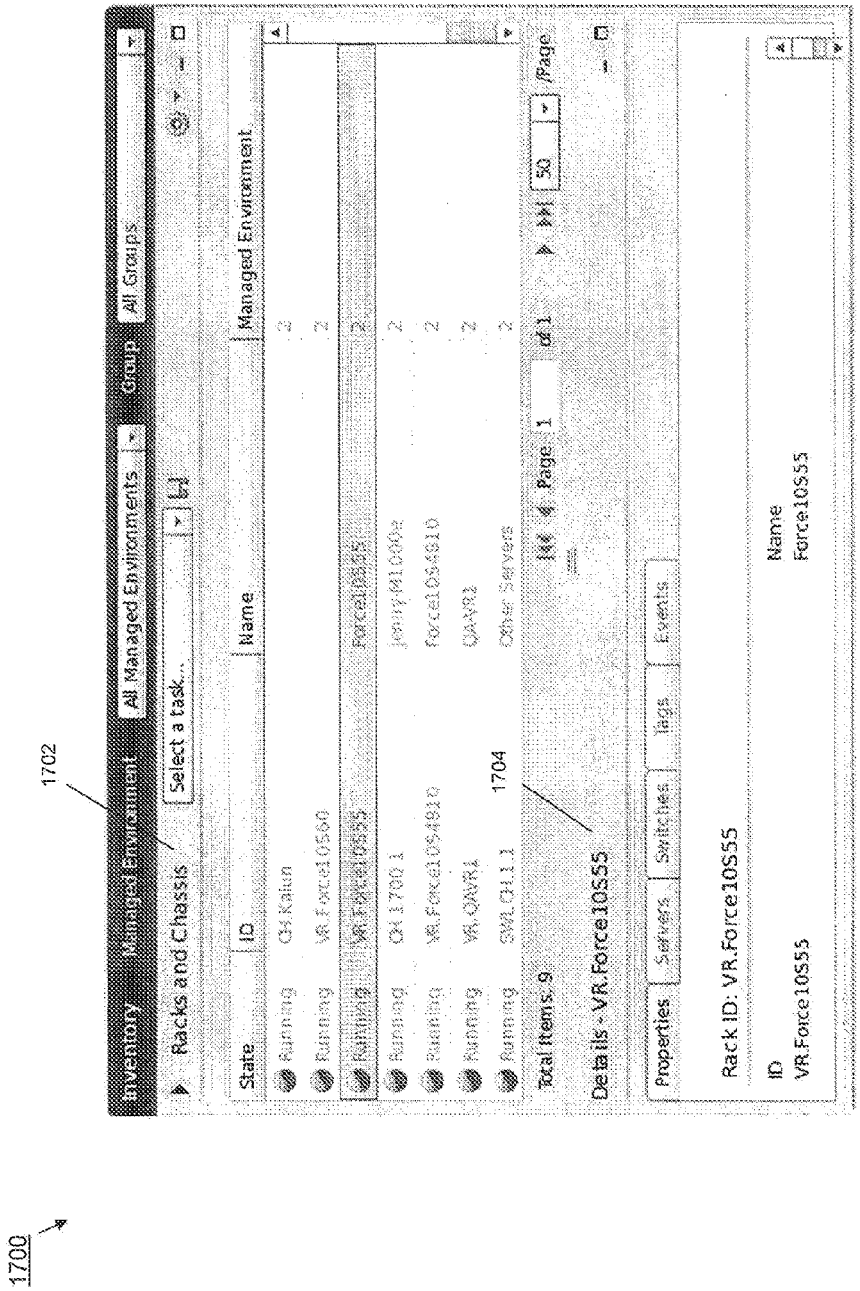
FIG. 17 is a screen shot illustrating an embodiment of a racks and chassis inventory screen provided by a controller manager.

FIG. 17 is an embodiment of a racks and chassis inventory screen 1700 provided by the controller manager application on the controller manager in response to the user selecting the racks and chassis link 1604a discussed above with reference to FIG. 16. The racks and chassis inventory screen 1700 provides a racks and chassis section 1702 and a racks and chassis details 1704 that allow a user of the controller manager application to view racks and chassis associated with controller environments managed by the controller manager. For example, the racks and chassis section 1702 illustrates a plurality of virtual and/or physical racks of heterogeneous servers included in controller environments managed by the controller manager. In response to selecting any of the virtual or physical racks of heterogeneous servers in the racks and chassis section 1702, the racks and chassis details 1704 provides details about that rack, as illustrated.

Figure 18:
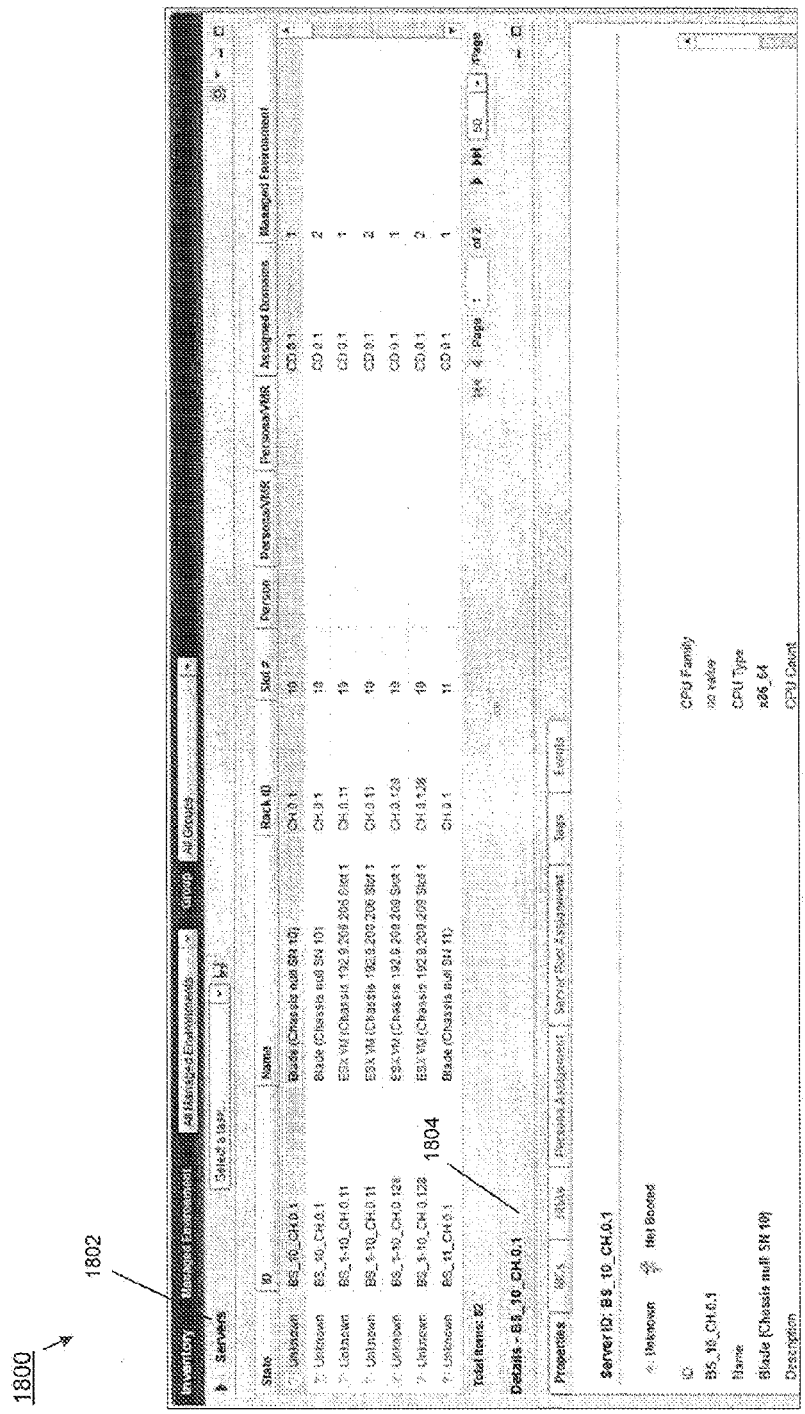
FIG. 18 is a screen shot illustrating an embodiment of a server inventory screen provided by a controller manager.

FIG. 18 is an embodiment of a servers inventory screen 1800 provided by the controller manager application on the controller manager in response to the user selecting the servers link 1604b discussed above with reference to FIG. 16. The servers inventory screen 1800 provides a servers section 1802 and a severs details 1804 that allow a user of the controller manager application to view severs associated with controller environments managed by the controller manager. For example, the severs section 1802 illustrates a plurality of servers included in controller environments managed by the controller manager. In response to selecting any of the servers in the servers section 1802, the severs details 1804 provides details about that sever, as illustrated.

Figure 19:
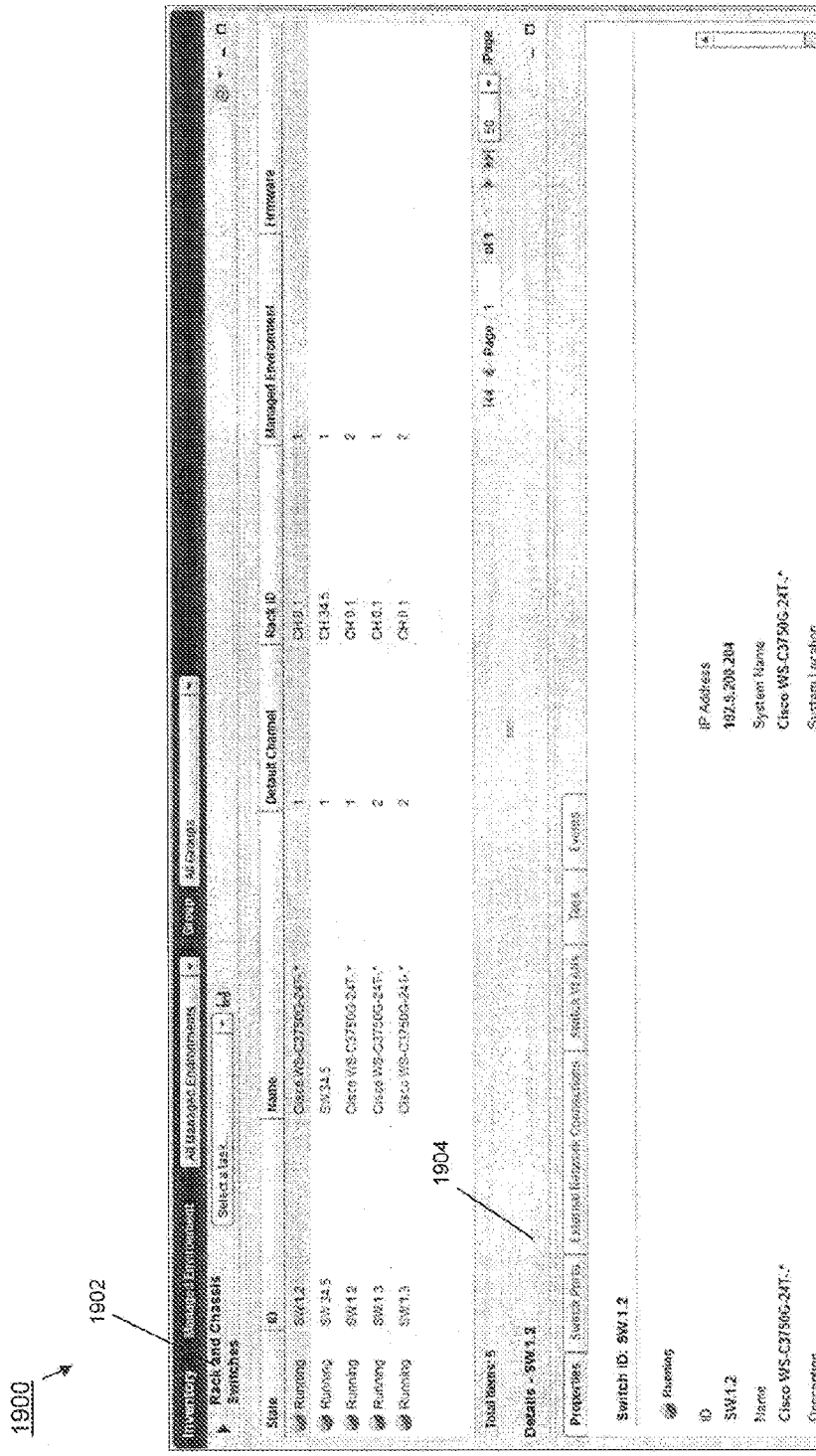
FIG. 19 is a screen shot illustrating an embodiment of a racks and chassis switches inventory screen provided by a controller manager.

FIG. 19 is an embodiment of a rack and chassis switches inventory screen 1900 provided by the controller manager application on the controller manager in response to the user selecting the rack and chassis switches link 1604c discussed above with reference to FIG. 16. The rack and chassis switches inventory screen 1900 provides a rack and chassis switches section 1902 and a rack and chassis switches details 1904 that allow a user of the controller manager application to view rack and chassis switches associated with controller environments managed by the controller manager. For example, the rack and chassis switches section 1902 illustrates a plurality of rack and chassis switches included in controller environments managed by the controller manager. In response to selecting any of the rack and chassis switches in the rack and chassis switches section 1902, the rack and chassis switches details 1904 provides details about that rack and chassis switch, as illustrated.

Figure 20:
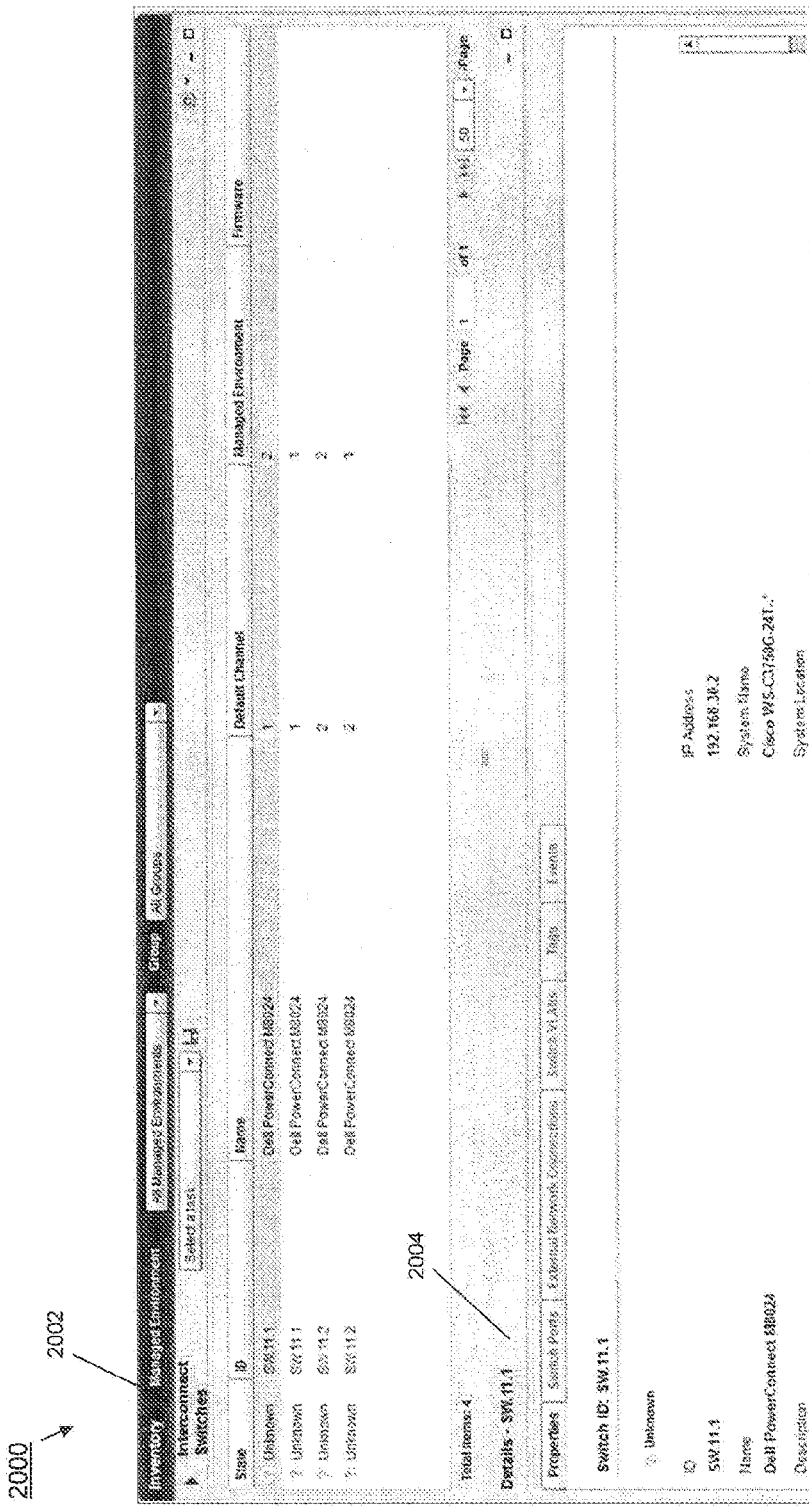
FIG. 20 is a screen shot illustrating an embodiment of an interconnect switches inventory screen provided by a controller manager.

FIG. 20 is an embodiment of an interconnect switches inventory screen 2000 provided by the controller manager application on the controller manager in response to the user selecting the interconnect switches link 1604d discussed above with reference to FIG. 16. The interconnect switches inventory screen 2000 provides an interconnect switches section 2002 and an interconnect switches details 2004 that allow a user of the controller manager application to view interconnect switches associated with controller environments managed by the controller manager. For example, the interconnect switches section 2002 illustrates a plurality of interconnect switches included in controller environments managed by the controller manager. In response to selecting any of the interconnect switches in the interconnect switches section 2002, the interconnect switches details 2004 provides details about that interconnect switch, as illustrated.

Figure 21:
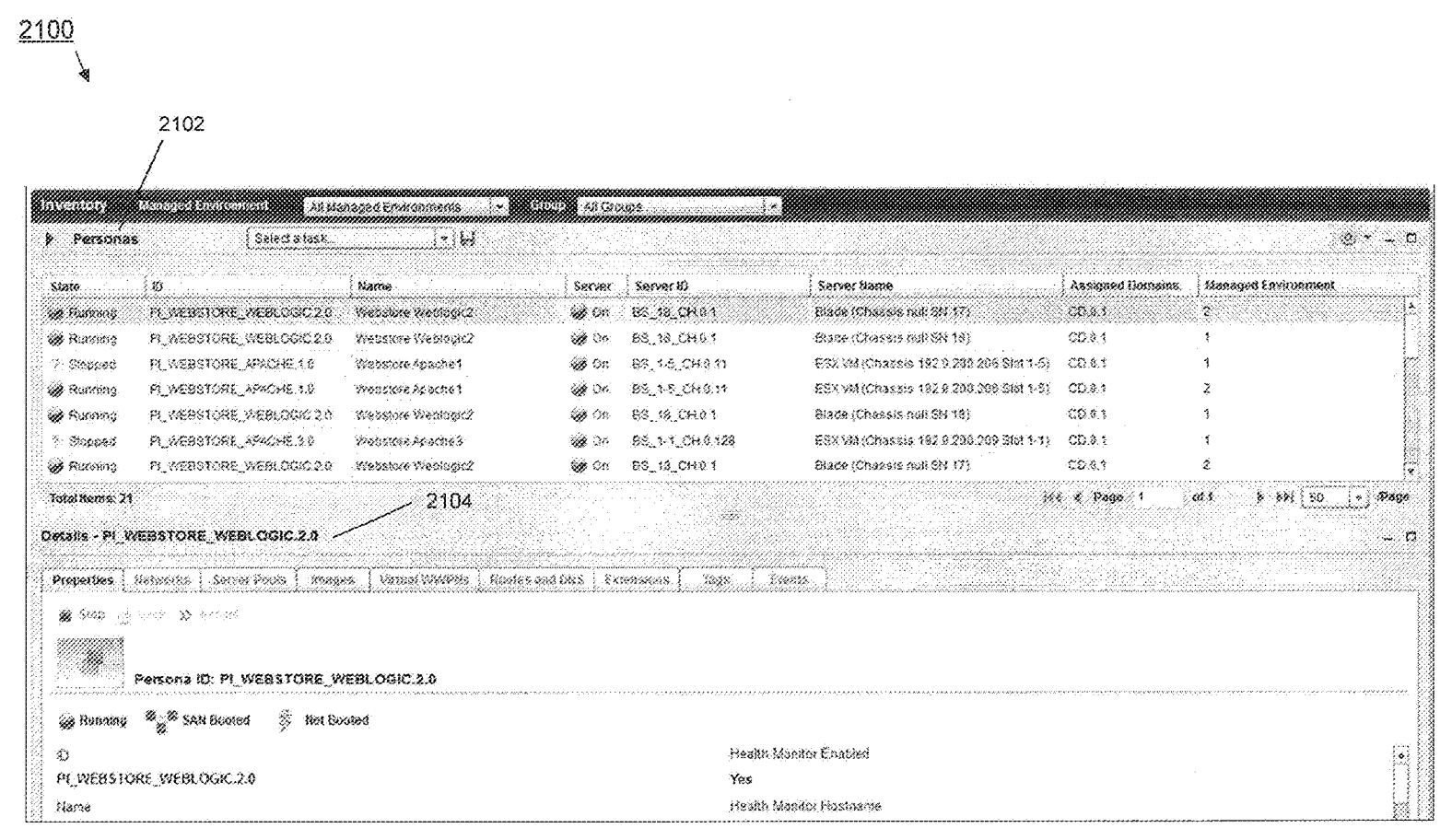

FIG. 21 is an embodiment of a personas inventory screen 2100 provided by the controller manager application on the controller manager in response to the user selecting the personas link 1604e discussed above with reference to FIG. 16. The personas inventory screen 2100 provides a personas section 2102 and a personas details 2104 that allow a user of the controller manager application to view personas associated with controller environments managed by the controller manager. For example, the personas section 2102 illustrates a plurality of personas included in controller environments managed by the controller manager. In response to selecting any of the personas in the personas section 2102, the personas details 2104 provides details about that persona, as illustrated.

Figure 22:
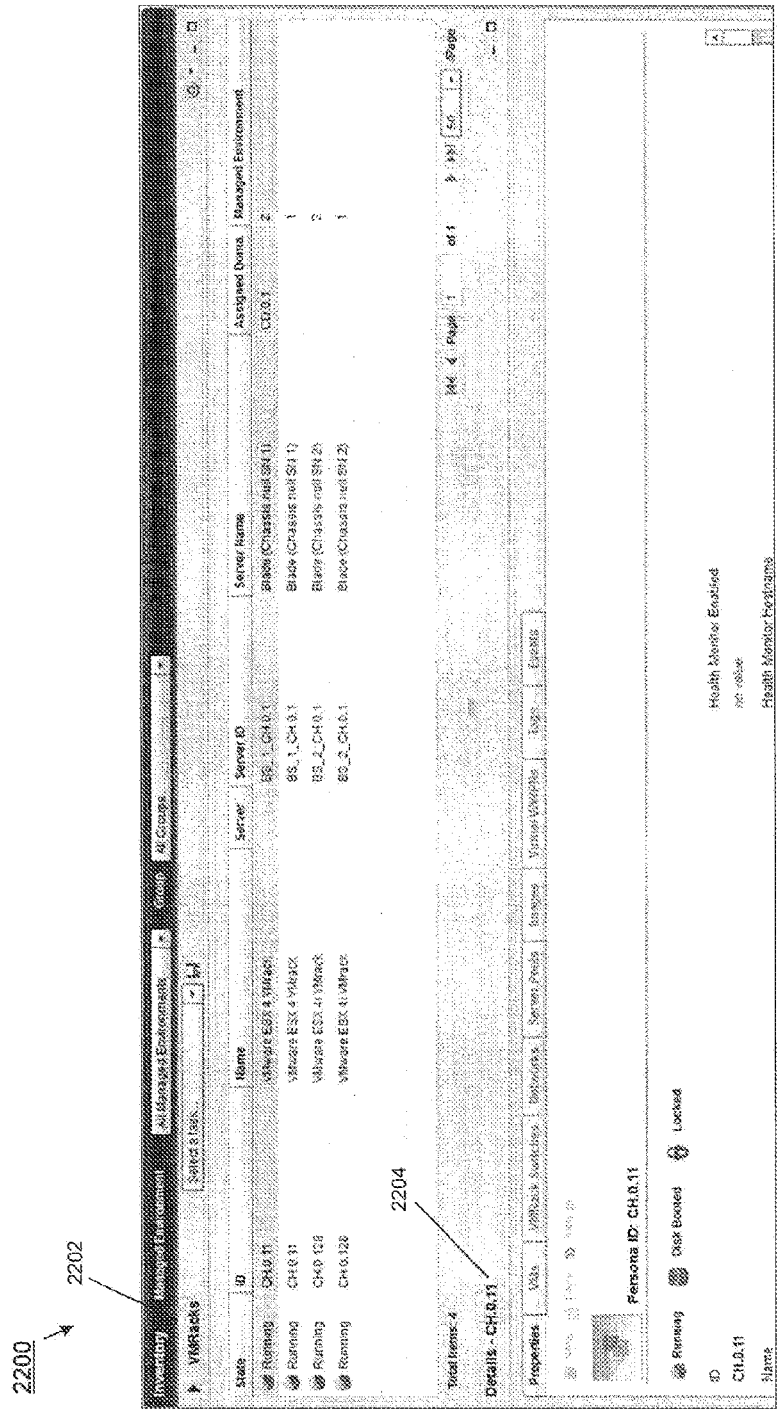
FIG. 22 is a screen shot illustrating an embodiment of a VMRacks inventory screen provided by a controller manager.

FIG. 22 is an embodiment of a VMRacks inventory screen 2200 provided by the controller manager application on the controller manager in response to the user selecting the VMRacks link 1604f discussed above with reference to FIG. 16. The VMRacks inventory screen 2200 provides a VMRacks section 2202 and a VMRacks details 2204 that allow a user of the controller manager application to view VMRacks associated with controller environments managed by the controller manager. For example, the VMRacks section 2202 illustrates a plurality of VMRacks included in controller environments managed by the controller manager. In response to selecting any of the VMRacks in the VMRacks section 2202, the VMRacks details 2204 provides details about that VMRack, as illustrated.

Figure 23:
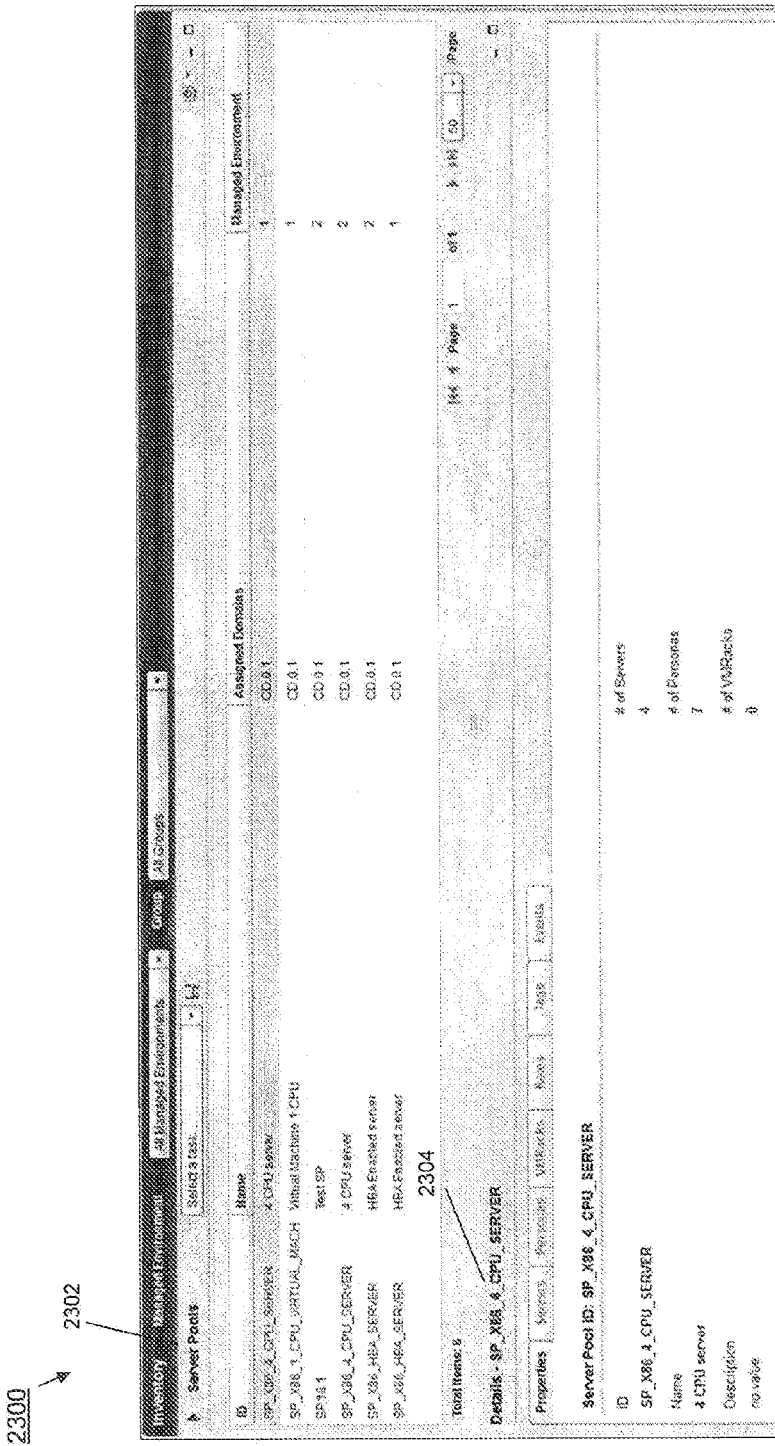
FIG. 23 is a screen shot illustrating an embodiment of a server pools inventory screen provided by a controller manager.

FIG. 23 is an embodiment of a server pools inventory screen 2300 provided by the controller manager application on the controller manager in response to the user selecting the server pools link 1604g discussed above with reference to FIG. 16. The server pools inventory screen 2300 provides a server pools section 2302 and a server pools details 2304 that allow a user of the controller manager application to view server pools associated with controller environments managed by the controller manager. For example, the server pools section 2302 illustrates a plurality of server pools included in controller environments managed by the controller manager. In response to selecting any of the server pools in the server pools section 2302, the server pools details 2304 provides details about that server pool, as illustrated.

Figure 24:
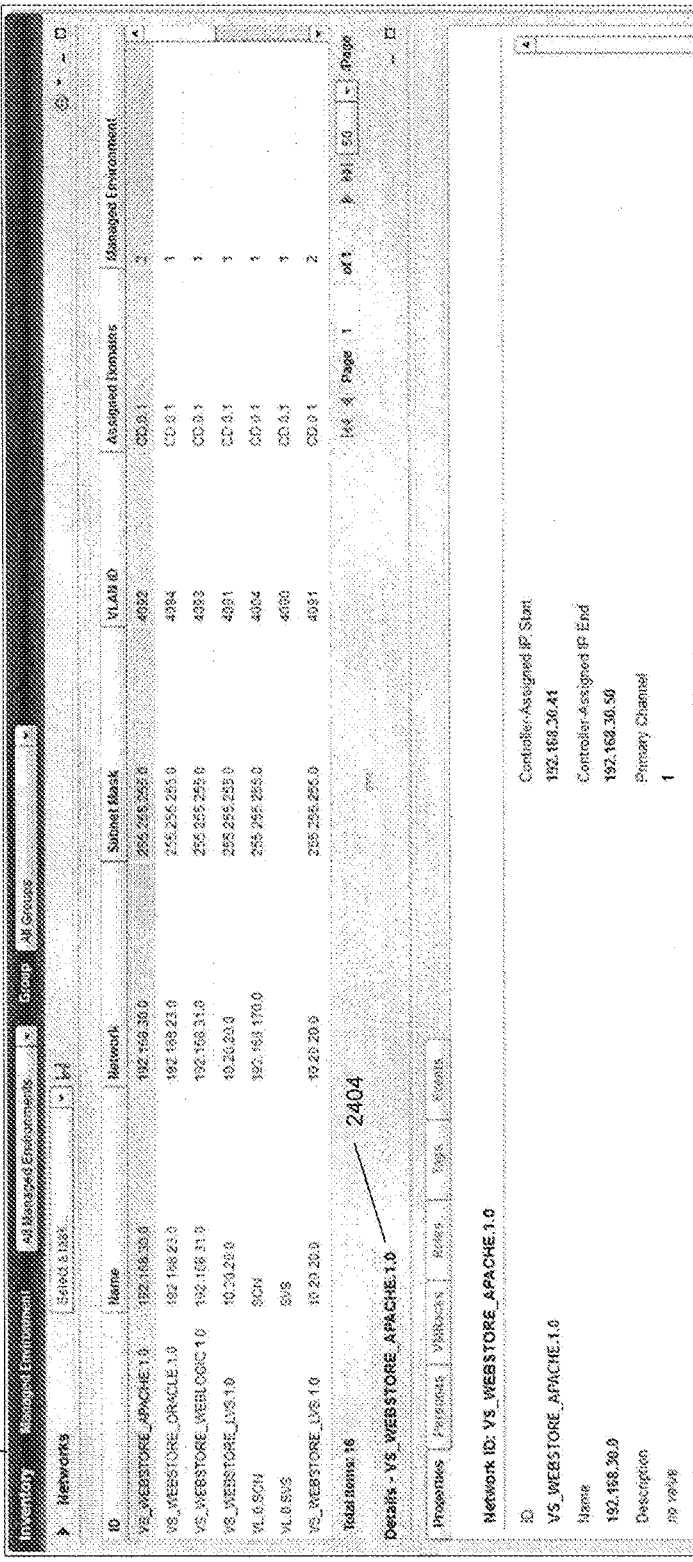
FIG. 24 is a screen shot illustrating an embodiment of a networks inventory screen provided by a controller manager.

FIG. 24 is an embodiment of a networks inventory screen 2400 provided by the controller manager application on the controller manager in response to the user selecting the networks link 1604h discussed above with reference to FIG. 16. The networks inventory screen 2400 provides a networks section 2402 and a networks details 2404 that allow a user of the controller manager application to view networks associated with controller environments managed by the controller manager. For example, the networks section 2402 illustrates a plurality of networks included in controller environments managed by the controller manager. In response to selecting any of the networks in the networks section 2402, the networks details 2404 provides details about that network, as illustrated.

Figure 25:
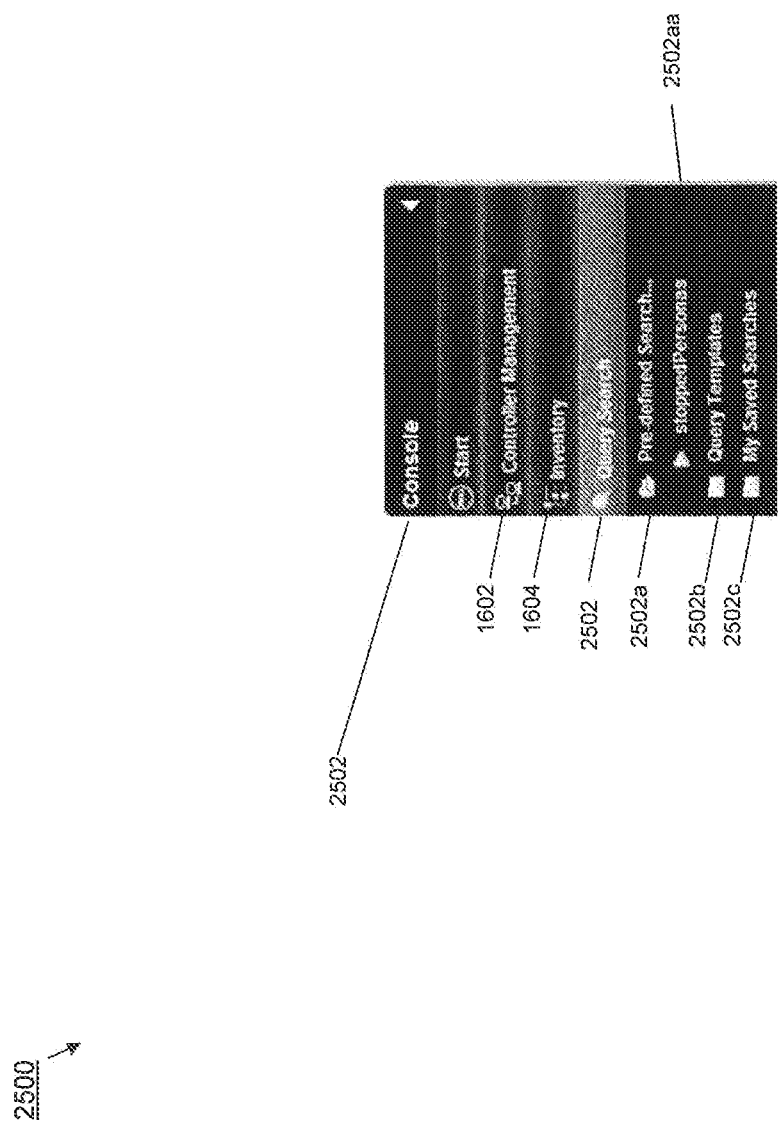
FIG. 25 is a screen shot illustrating an embodiment of a menu provided by a controller manager.

FIG. 25 is an embodiment of a menu 2500, similar to the menu 1600 discussed above with reference to FIG. 16, that is provided by the controller manager application on the controller manager that allows a user to move between the different functionality discussed above with reference to FIG. 13. For example, the menu 2500 includes the controller management link 1602 that may be selected by the user to access the controller management screen 1500, discussed above with reference to FIG. 15, as well as the inventory heading 1604 with the links that allow a user to view all elements of managed controllers, including personas, servers, and networks provided by the controller manager application on the controller manager according to the inventory functionality 1306 discussed above with reference to FIG. 13 and details with regard to FIGS. 17-25. The menu 2500 also includes a query search heading 2502 with links that allow a user to create their own queries and folders that allow the user to save queries for later use. Under the query search heading 2502, a user is provided access to a plurality of query search folders, discussed in further detail below, including a pre-defined search folder 2502a (including a stoppedPersonas link 2502aa for a saved query search), a query template folder 2502b, and a my saved searches folder 2502c.

Figure 26A:
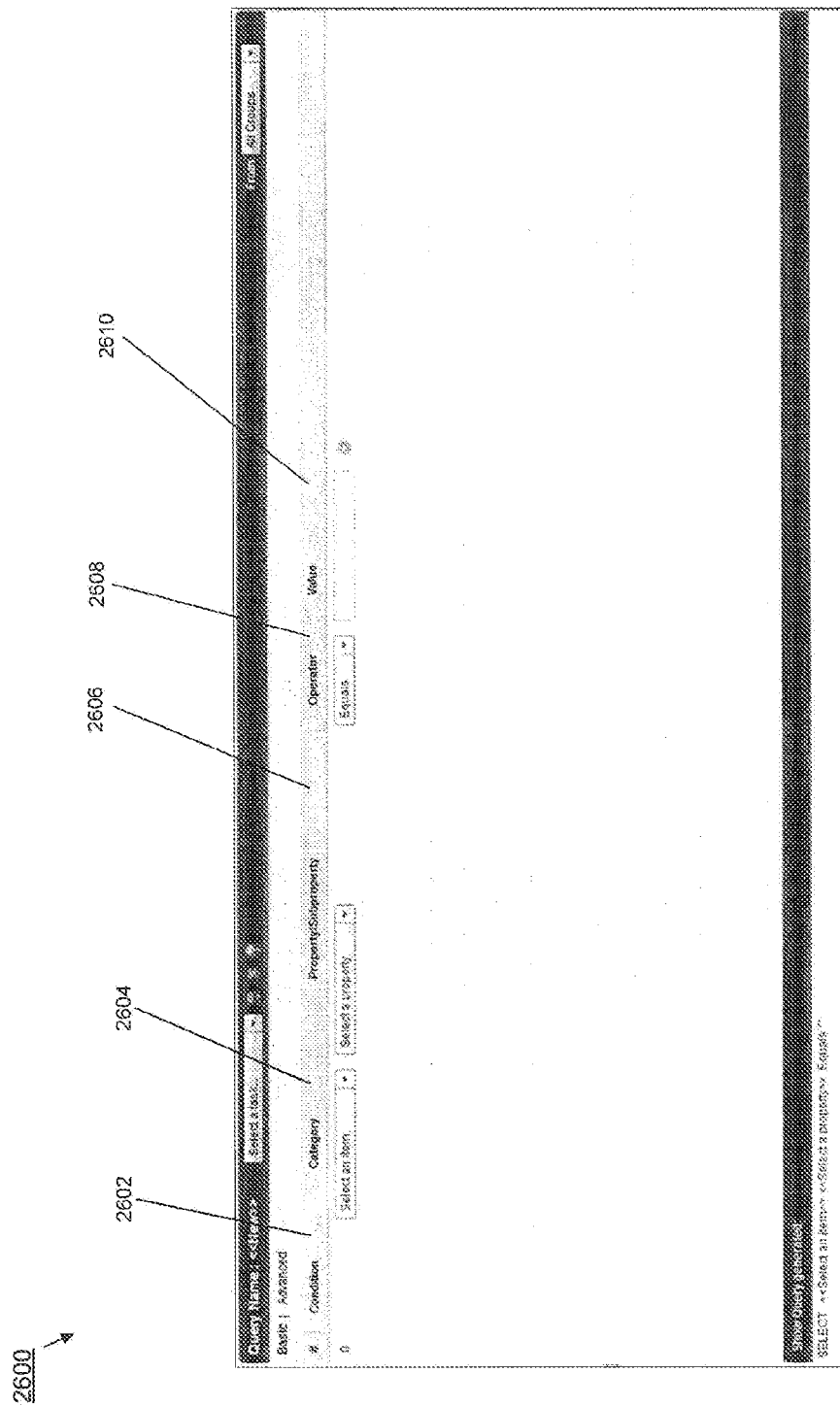
FIG. 26*a* is a screen shot illustrating an embodiment of a query search screen provided by a controller manager.
Figure 26B:
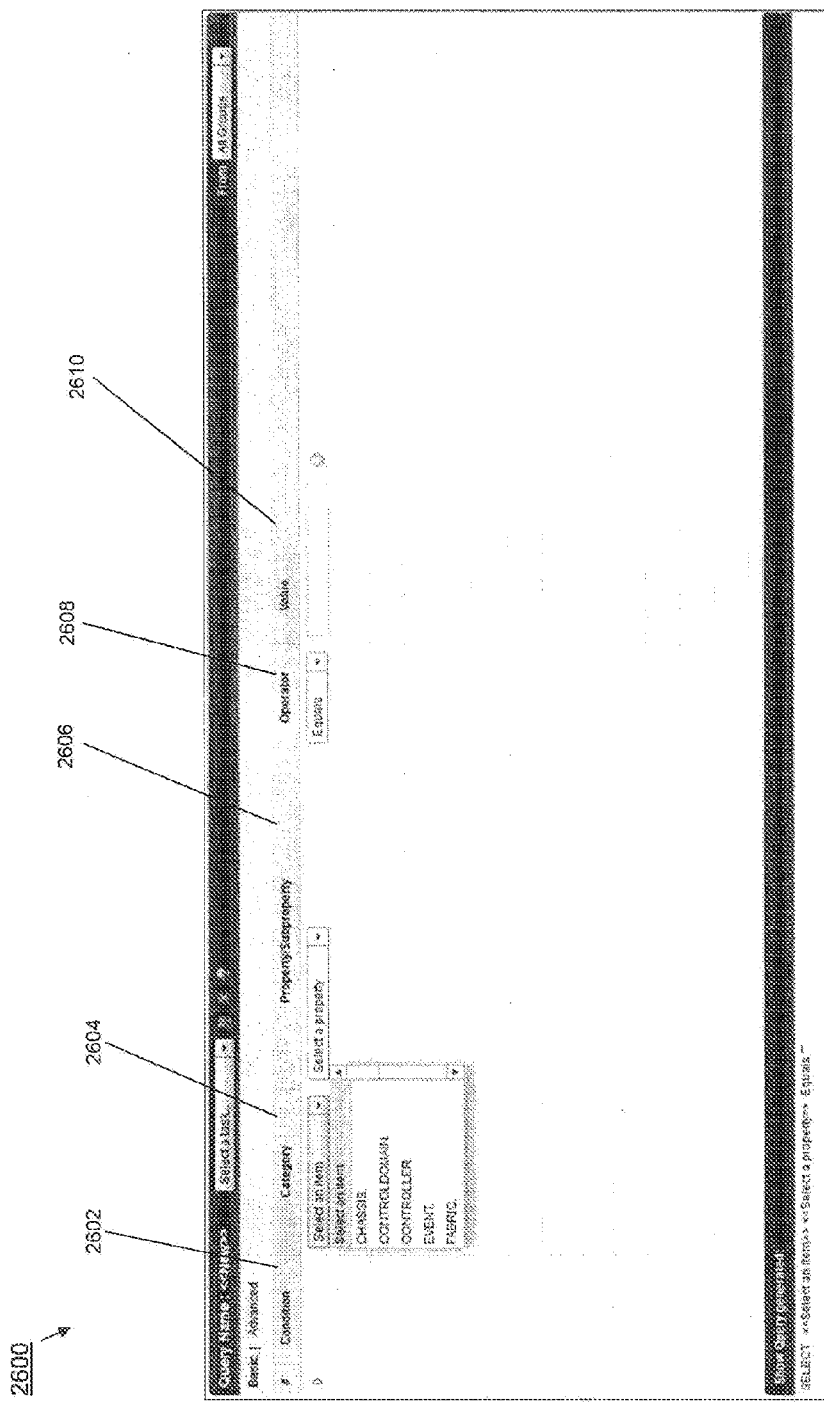
FIG. 26*b* is a screen shot illustrating an embodiment of a query search screen provided by a controller manager with a user selecting a category.
Figure 26C:
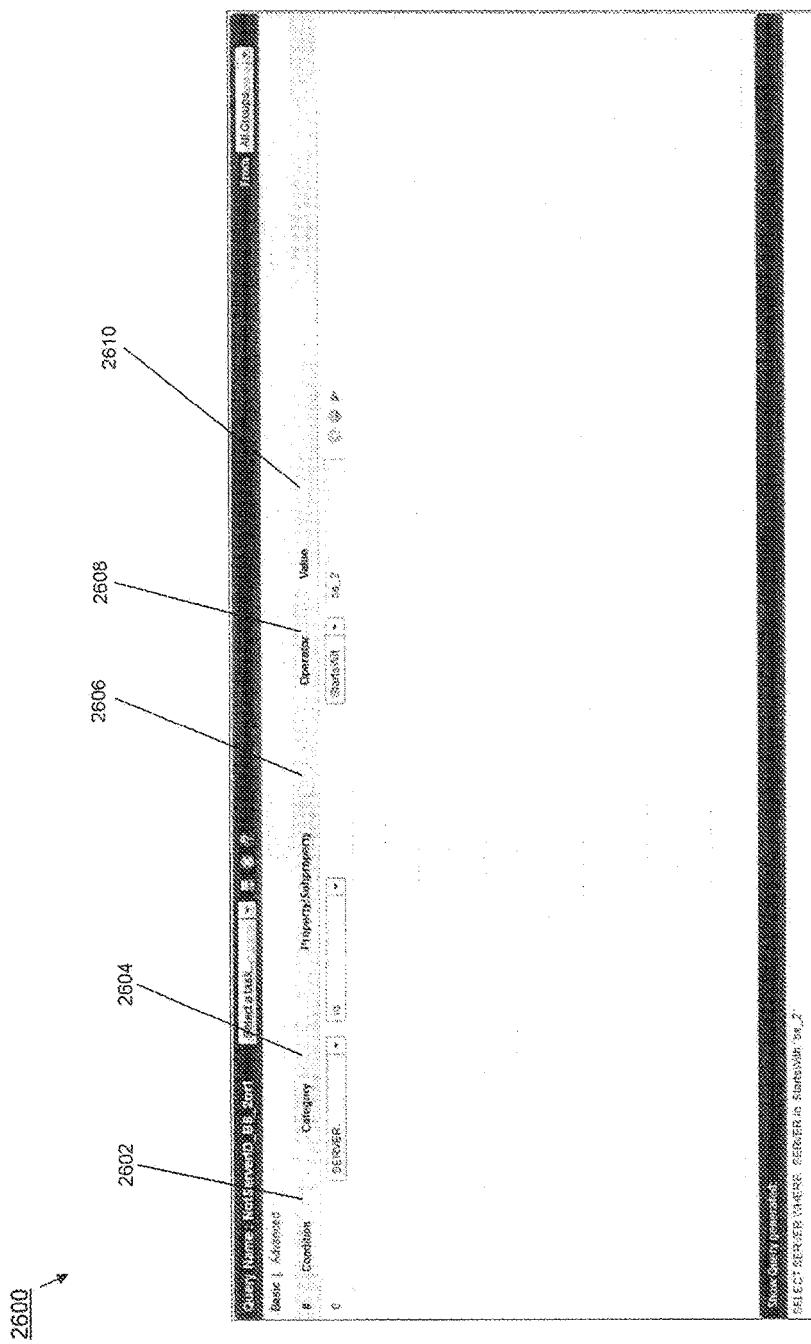
FIG. 26*c* is a screen shot illustrating an embodiment of a query search screen provided by a controller manager with a plurality of user provided query terms.

Referring now to FIGS. 26a, 26b, and 26c, an embodiment of a query search screen 2600 is illustrated. The query search screen may be provided by the controller manager application on the controller manager in response to the user selecting the query search heading 2502 on the menu 2500, discussed above with reference to FIG. 25. FIG. 26a illustrates the query search screen 2600 that includes a condition column 2602, a category column 2604 with a drop-down category selector, a property/subproperty column 2606 with a drop-down property selector, an operator column 2608 with a drop-down operator selector, and a value column 2610. FIG. 26b illustrates the query search screen 2600 with the drop-down category selector in the category column 2604 used to select a category from amongst a CHASSIS, CONTROLDOMAIN, CONTROLLER, EVENT, and FABRIC. FIG. 26c illustrates the query search screen 2600 with a SERVER provided in the category column 2604, "id" provided in the property/subproperty column 2606, "StartsWith" operator provided in the operator column 2608, and "bs_2" provided in the value column 2610.

Figure 27:
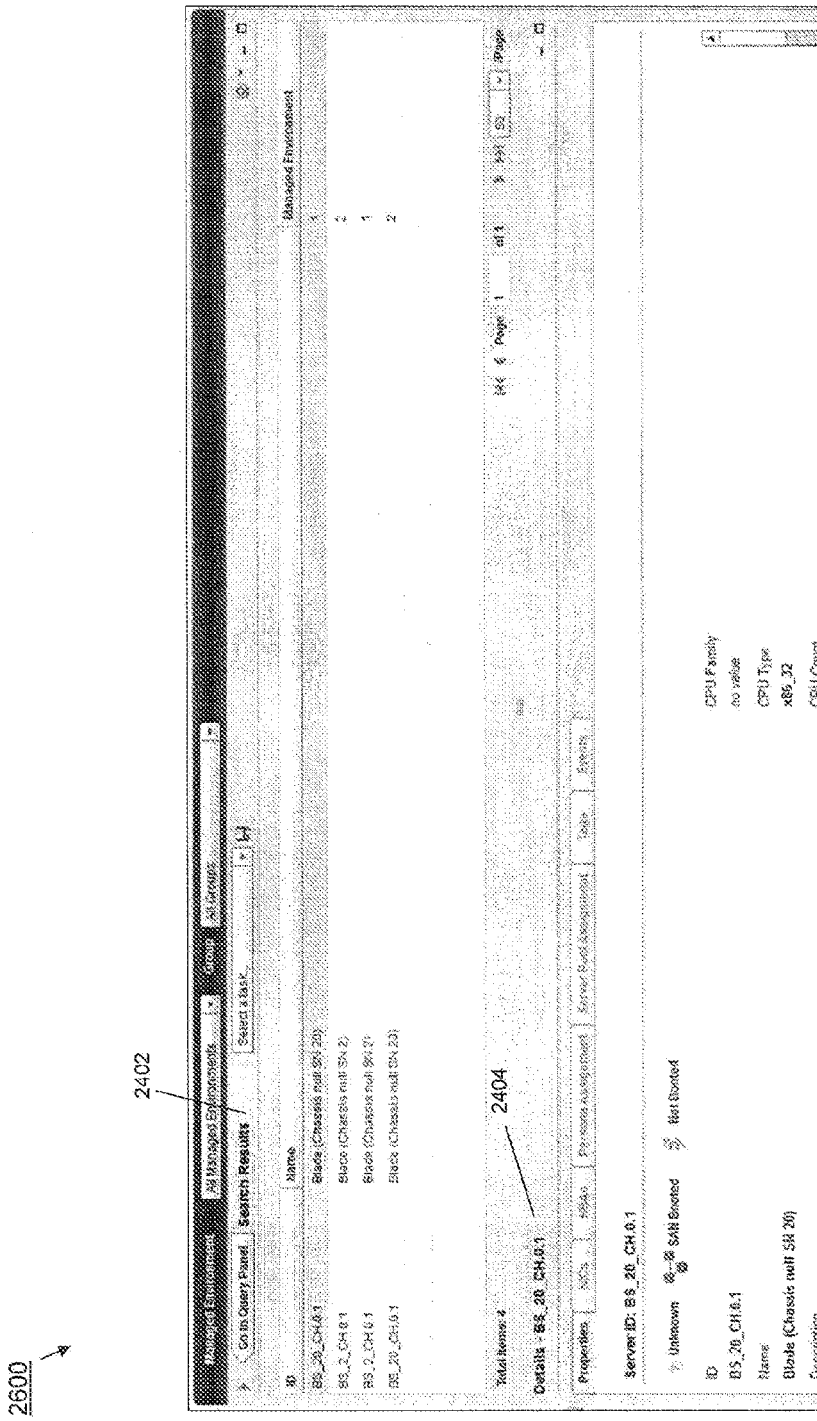
FIG. 27 is a screen shot illustrating an embodiment of a search results screen provided by a controller manager following a search according the query search screen of FIG. 26*c*.
Figure 28A:
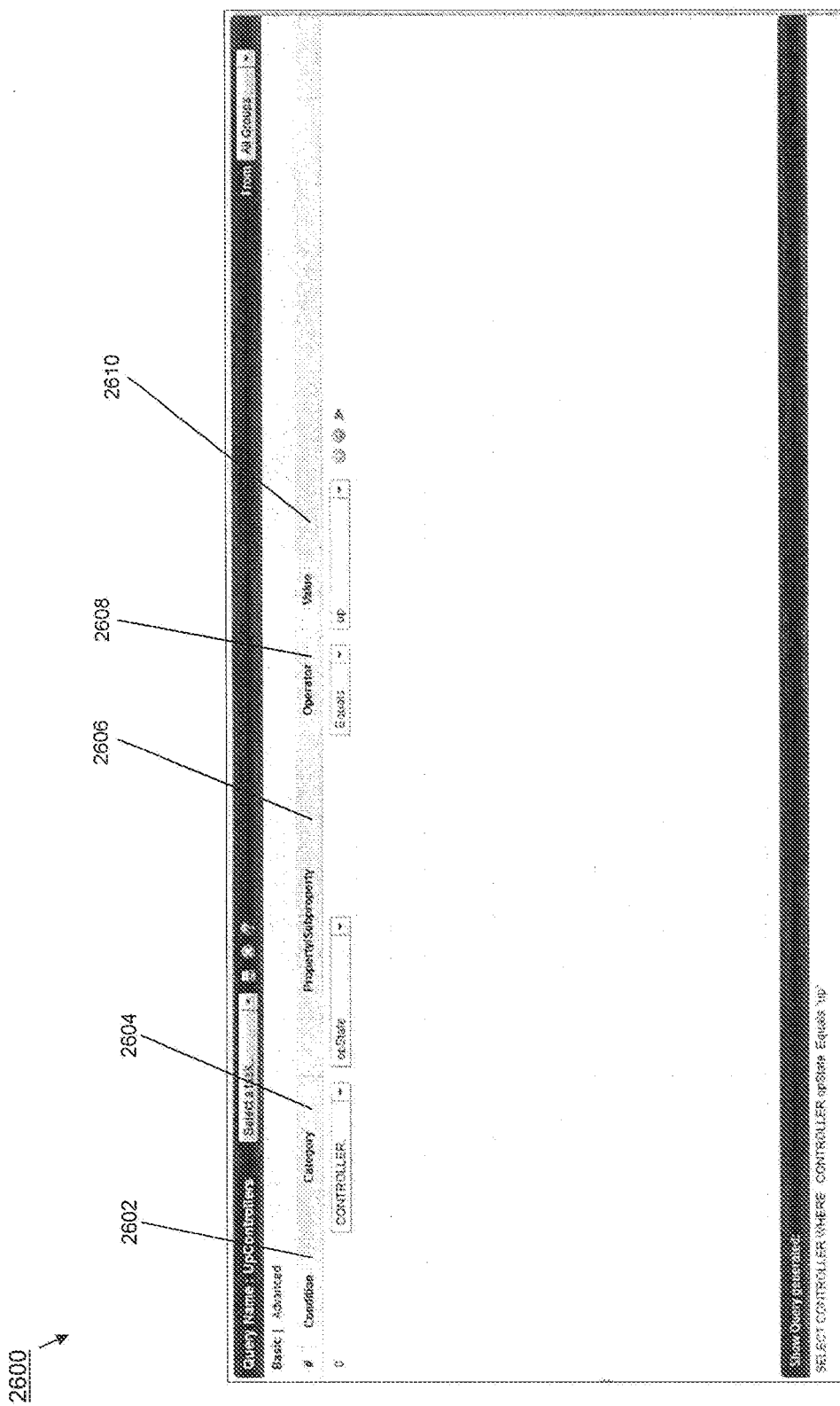
FIG. 28*a* is a screen shot illustrating an embodiment of a query search screen provided by a controller manager with a plurality of user provided query terms.
Figure 28B:
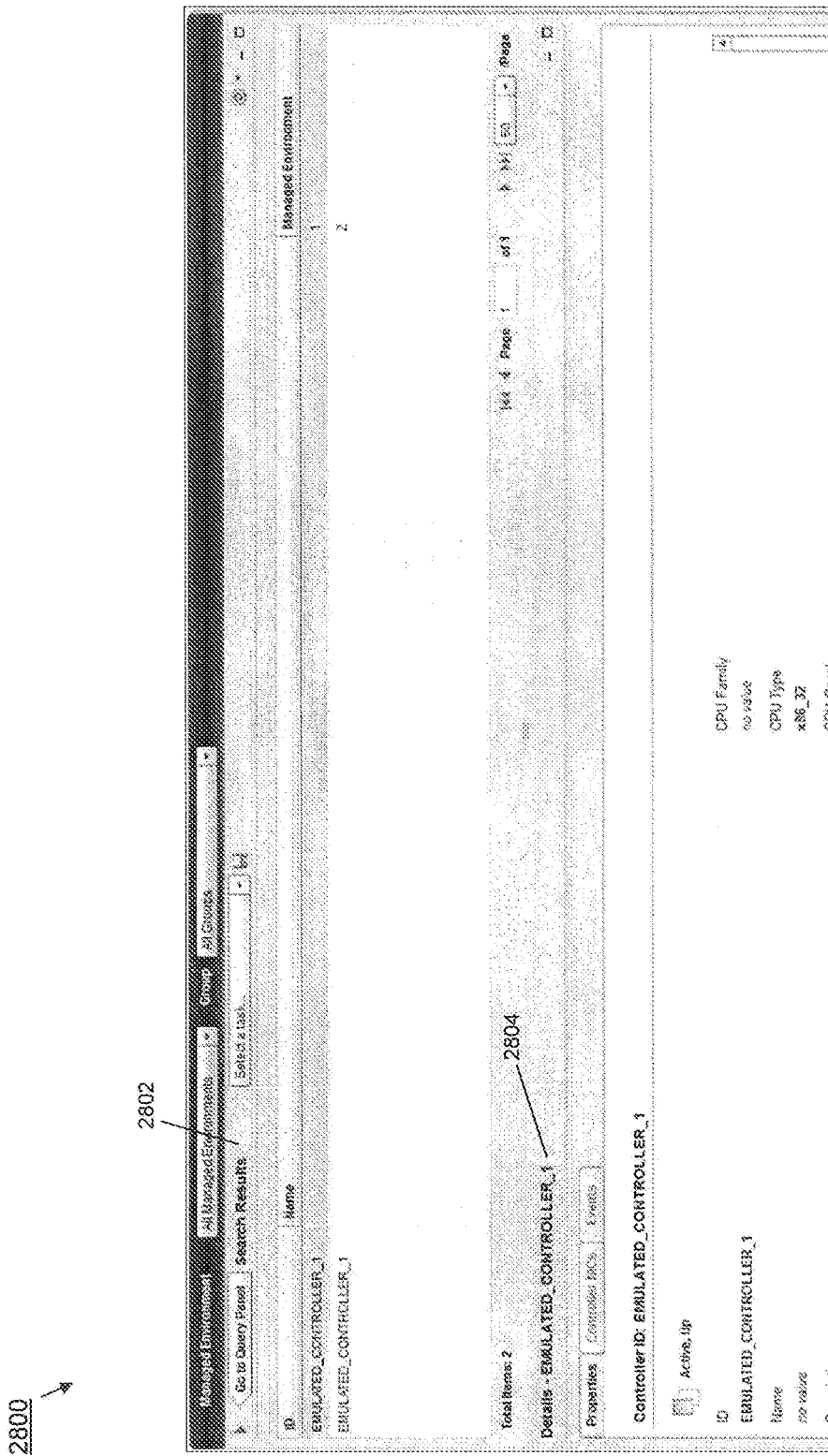
FIG. 28*b* is a screen shot illustrating an embodiment of a search results screen provided by a controller manager following a search according the query search screen of FIG. 28*a*.
Figure 29A:
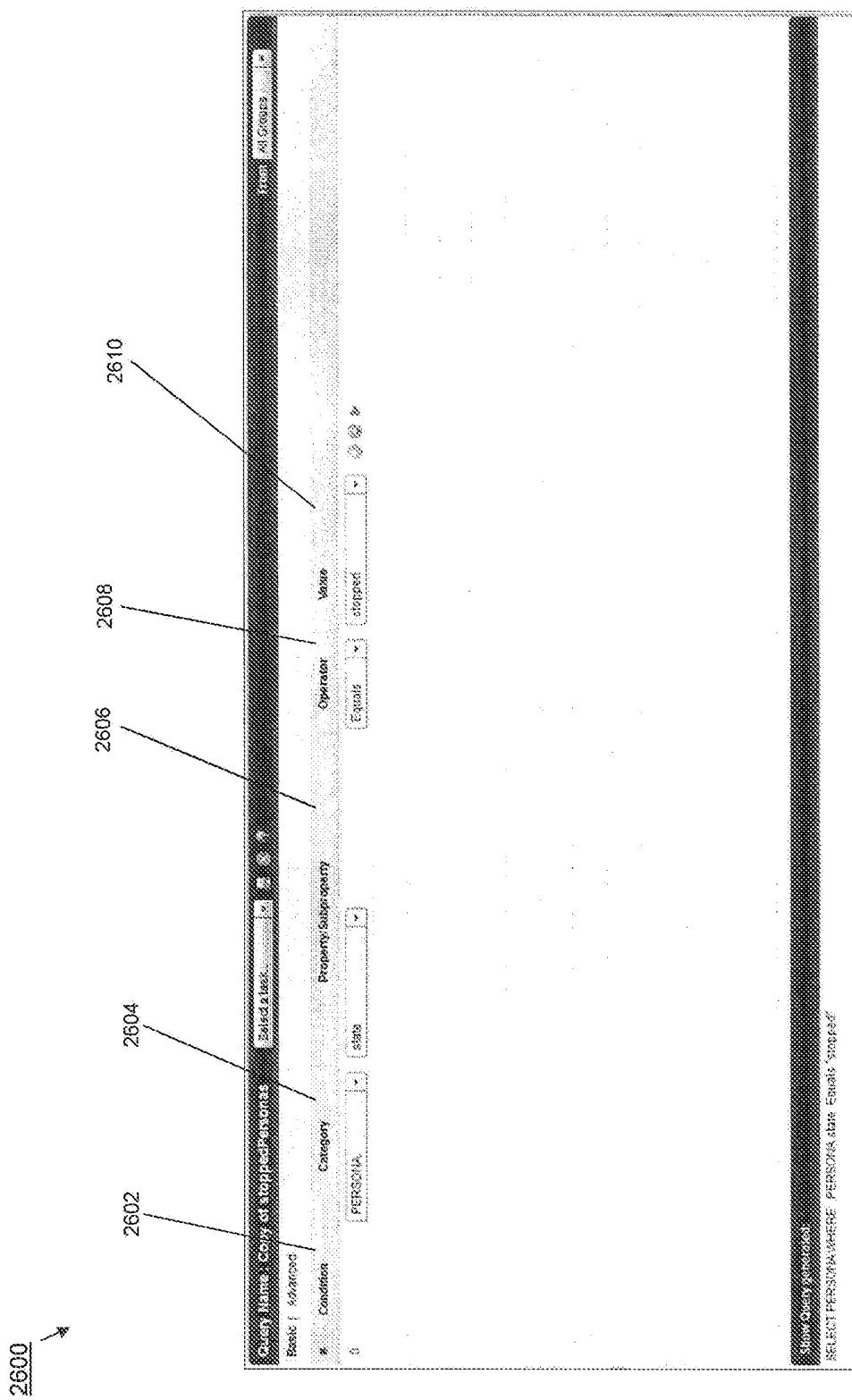
FIG. 29*a* is a screen shot illustrating an embodiment of a query search screen provided by a controller manager with a plurality of user provided query terms.
Figure 29B:
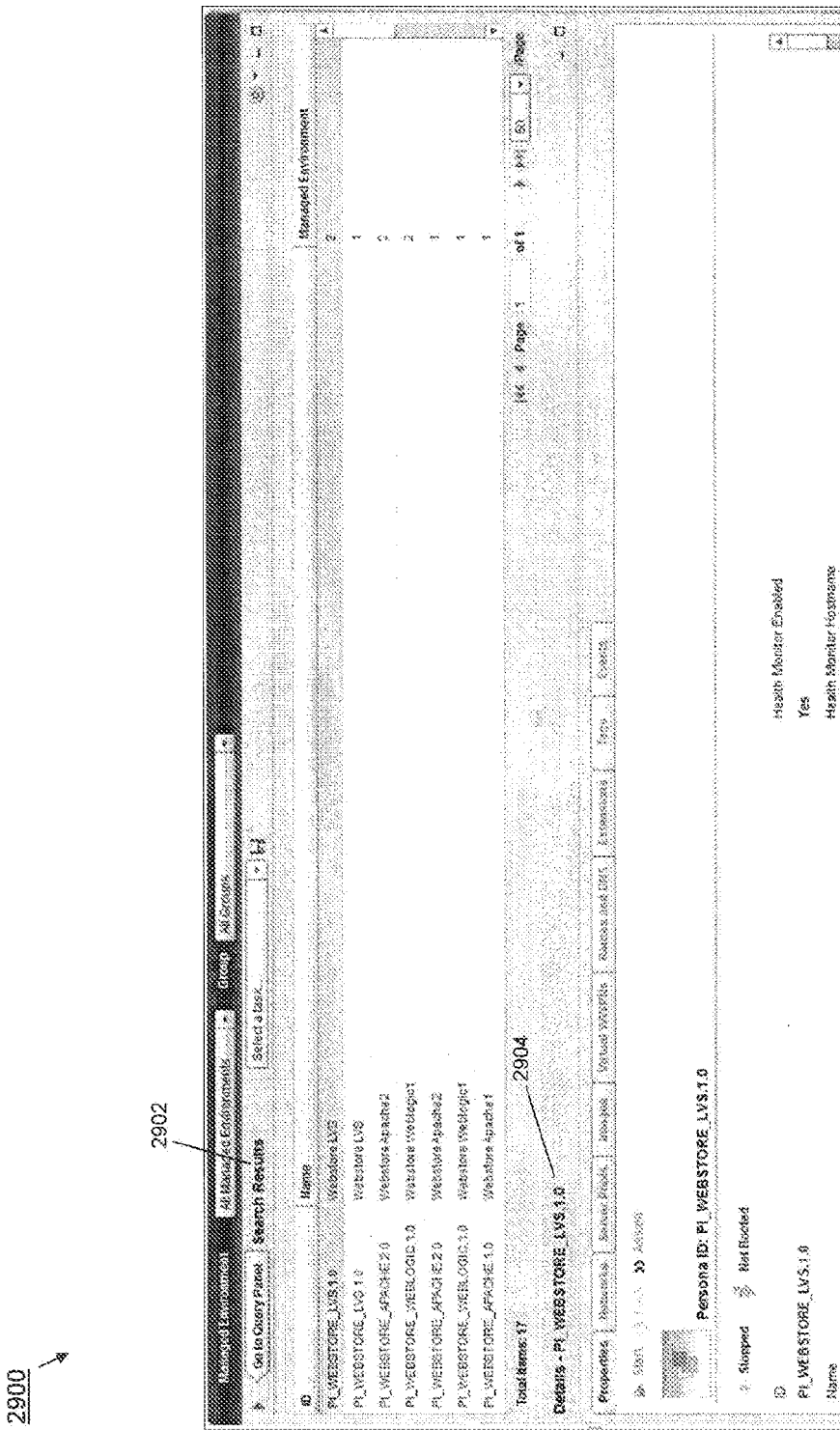
FIG. 29*b* is a screen shot illustrating an embodiment of a search results screen provided by a controller manager following a search according the query search screen of FIG. 29*a*.

FIG. 27 illustrates an embodiment of a search results screen 2700 that may result from the search conducted according to the query search screen 2600 discussed above with reference to FIGS. 26a, 26b, and 26c. The search results screen 2700 provides a search results section 2702 and a search results details 2704 that allow a user of the controller manager application to view search results associated with controller environments managed by the controller manager. For example, the search results section 2702 illustrates a plurality of servers included in controller environments managed by the controller manager that include an identification ("id") that starts with "bs_2" (according to the search discussed above with reference to FIGS. 26a, 26b, and 26c.) In response to selecting any of the search results in the search results section 2702, the search results details 2704 provides details about that search result, as illustrated FIG. 28a illustrates the query search screen 2600 with a CONTROLLER provided in the category column 2604, "opState" provided in the property/subproperty column 2606, "Equals" operator provided in the operator column 2608, and "up" provided in the value column 2610. FIG. 28b illustrates an embodiment of a search results screen 2800 that may result from the search conducted according to the query search screen 2600 discussed above with reference to FIG. 28a. The search results screen 2800 provides a search results section 2802 and a search results details 2804 that allow a user of the controller manager application to view search results associated with controller environments managed by the controller manager. For example, the search results section 2802 illustrates a plurality of controllers included in controller environments managed by the controller manager that include an operational state ("opState") that is active or "up" (according to the search discussed above with reference to FIG. 28a.) In response to selecting any of the search results in the search results section 2802, the search results details 2804 provides details about that search result, as illustrated.

Figure 30A:
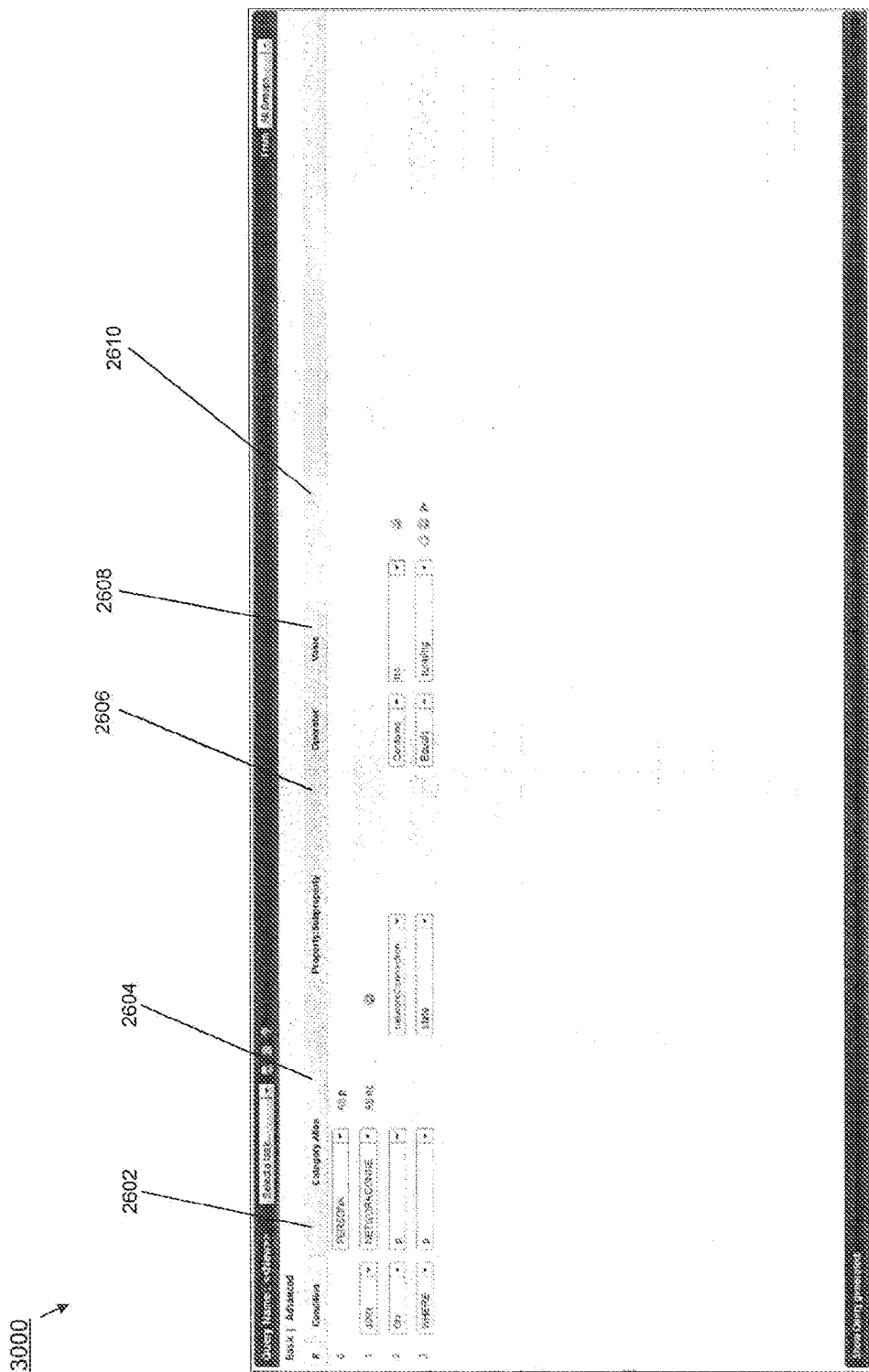
FIG. 30*a* is a screen shot illustrating an embodiment of an advanced query search screen provided by a controller manager with a plurality of user provided query terms.
Figure 30B:
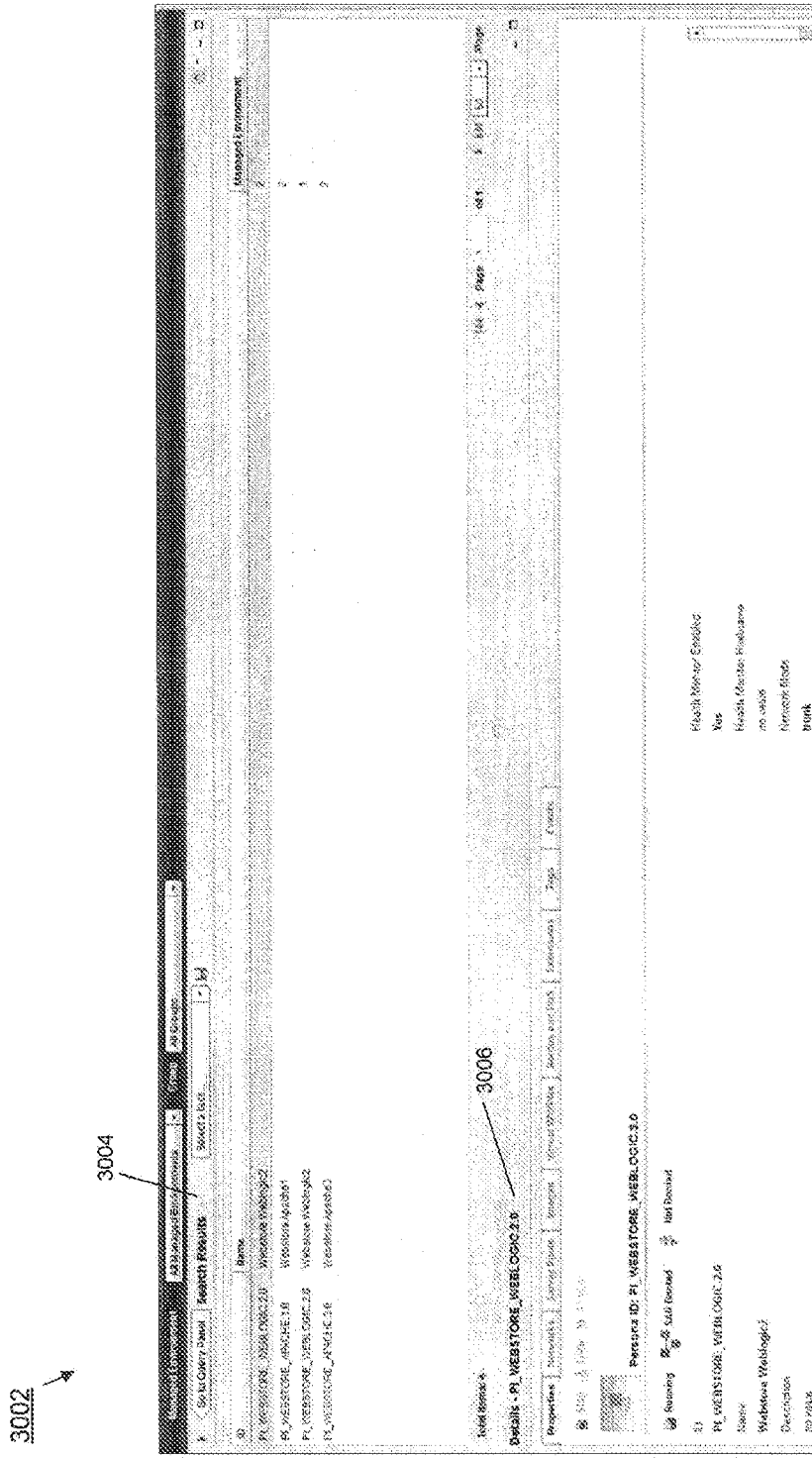
FIG. 30*b* is a screen shot illustrating an embodiment of a search results screen provided by a controller manager following a search according the advanced query search screen of FIG. 30*a*.

FIG. 30a illustrates an advanced query search screen 3000 that includes the same columns 2602, 2604, 2606, 2608, and 2610 provided on the query search screen 2600, but provides for a more specific search with multiple conditions. The multiple conditions in the illustrated embodiment specify that the search should return all persona objects that are in a running state and have at least one network connection object associated with them. Advanced queries can be created when information needs to be acquired from multiple tables in the database. The query builder shown in FIG. 30 provides an intuitive interface used to build ad hoc queries. SQL like queries can be built and users may be provided an option to view text based queries in a viewing pane. FIG. 30b illustrates an embodiment of a search results screen 3002 that may result from the search conducted according to the query search screen 3000 discussed above with reference to FIG. 30a. The search results screen 3002 provides a search results section 3004 and a search results details 3006 that allow a user of the controller manager application to view search results associated with controller environments managed by the controller manager. For example, the search results section 3002 illustrates a plurality of personas included in controller environments managed by the controller manager that include personas that have a network connection and are in a running state. The results of the advanced query is in a tabular format that allows the user to scroll through and view results of the record set (according to the search discussed above with reference to FIG. 30a.) In response to selecting any of the search results in the search results section 3004, the search results details 3006 provides details about that search result, as illustrated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multiple system control network management system, comprising:
  a persona storage device storing a plurality of personas, wherein each of the plurality of personas includes an operating system image, an application provided on that operating system image, and configuration metadata, and wherein each of the plurality of personas is configured to boot on an information handling system (IHS);
  a plurality of controllers coupled to the persona storage device, wherein each of the plurality of controllers is coupled to a respective system control network to provide a respective controller environment,
    wherein each respective system control network includes at least one IHS that is configured to run at least one persona that is provisioned to the at least one IHS by a respective controller of the plurality of controllers from the persona storage device, and
    wherein each of the plurality of controllers is configured to store personas and update the plurality of personas on the persona storage device based on the at least one persona running on the at least one IHS included in each respective system control network;
  a controller manager database storing a list of active personas running on each respective system control network; and
  a controller manager coupled to each of the plurality of controllers, the persona storage device, and the controller manager database, wherein the controller manager is configured to:
    monitor the respective controller environment provided by each of the plurality of controllers;
    determine, using the list of active personas, that a first persona run on a first IHS in a first controller environment provided by a first controller of the plurality of controllers should be booted on a second IHS in a second controller environment provided by a second controller of the plurality of controllers;
    retrieve the first persona from the persona storage device;
    boot the first persona that was retrieved from the persona storage device on the second IHS in order to run the first persona on the second IHS;
    receive a first change object from at least one of the plurality of controllers, wherein the first change object includes a modification to the first persona run on the second IHS;
    apply the modification to the first persona to provide a second persona; and
    replace the first persona in the persona storage device with the second persona.

2. The multiple system control network management system of claim 1, wherein the monitoring of the respective controller environment provided by each of the plurality of controllers includes monitoring state changes in each respective controller environment.

3. The multiple system control network management system of claim 1, wherein the controller manager is configured to:
  detect a failure of a third controller of the plurality of controllers that provides a third controller environment in a first system control network that is coupled to the third controller;
  provide the personas associated with the third controller environment on the persona storage device; and
  boot, from the persona storage device on a second system control network, the personas associated with the third controller environment in order to redeploy the third controller environment on a fourth controller of the plurality of controllers.

4. The multiple system control network management system of claim 1, wherein the controller manager is configured to:
  detect a failure of a failed persona run on a third IHS in the first controller environment provided by the first controller of the plurality of controllers;
  identify the failed persona in the persona storage device; and
  use the failed persona identified in the persona storage device to restart the failed persona on a fourth IHS in the second controller environment provided by the second controller of the plurality of controllers.

5. The multiple system control network management system of claim 1, wherein the controller manager is configured to:
  stop the first persona run on the first IHS before the first persona is booted on the second IHS.

6. The multiple system control network management system of claim 1, wherein at least some of the communication between the controller manager and the plurality of controllers is accomplished using a Structured Query Language (SQL) syntax.

7. An information handling system (IHS) comprising:
  a communications system that is configured to couple to a plurality of controllers that are each coupled to a respective system control network to provide a respective controller environment;
  a processing system coupled to the communications system; and
  a non-transitory memory system coupled to the processing system and including instructions that, when executed by the processing system, cause the processing system to:
    monitor the respective controller environment provided by each of the plurality of controllers, wherein a first controller environment provided by a first controller of the plurality of controllers includes a first host system running a first persona that is provisioned to the first host system by the first controller from a persona storage device that is coupled to the communications system and that stores a plurality of personas, and that includes an operating system image, an application associated with that operating system image, and configuration metadata, and wherein the first controller is configured to store personas and update the first persona on the persona storage device based on changes to the first persona running on the first host system;
    determine, using a list of active personas currently running on each respective controller environment stored on a controller manager database that is coupled to the communications system, that the first persona run on the first host system in the first controller environment provided by the first controller should be booted on a second host system in a second controller environment provided by a second controller of the plurality of controllers;
    retrieve the first persona in the persona storage device;
    boot the first persona that was retrieved from the persona storage device on the second host system in order to run the first persona on the second host system;
    receive a first change object from at least one of the plurality of controllers, wherein the first change object includes a modification to the first persona run on the second host system;
    apply the modification to the first persona to provide a second persona; and
    replace the first persona in the persona storage device with the second persona.

8. The IHS of claim 7, wherein the monitoring of the respective controller environment provided by each of the plurality of controllers includes monitoring state changes in each respective controller environment.

9. The IHS of claim 7, wherein the non-transitory memory system includes instructions that, when executed by the processing system, cause the processing system to:
  detect a failure of a third controller of the plurality of controllers that provides a third controller environment in a first system control network that is coupled to the third controller;
  provide the personas associated with the third controller environment on the persona storage device; and
  boot, from the persona storage device on a second system control network, the personas associated with the third controller environment in order to redeploy the third controller environment on a fourth controller of the plurality of controllers.

10. The IHS of claim 7, wherein the non-transitory memory system includes instructions that, when executed by the processing system, cause the processing system to:
  detect a failure of a failed persona in a third system control network associated with a third controller environment;
  identify the failed persona in the persona storage device; and
  use the failed persona identified in the persona storage device to restart the failed persona in a fourth controller environment associated with a fourth system control network.

11. The IHS of claim 7, wherein the non-transitory memory system includes instructions that, when executed by the processing system, cause the processing system to:
  stop the first persona run on the first host system before the first persona is booted on the second host system.

12. The IHS of claim 7, wherein at least some of the communication between the communications system and the plurality of controllers is accomplished using a Structured Query Language (SQL) syntax.

13. A method for managing multiple system control networks, comprising:
  monitoring, by a controller manager, a respective controller environment provided by each of a plurality of controllers, wherein a first controller environment provided by a first controller of the plurality of controllers includes a first host system running a first persona that is provisioned to the first host system by the first controller from a persona storage device that stores a plurality of personas, and that includes an operating system image, an application associated with that operating system image, and configuration metadata, and wherein the first controller is configured to store personas and update the first persona on the persona storage device based on changes to the first persona running on the first host system;

determining, by the controller manager using a list of active personas currently running on each respective controller environment stored on a controller manager database, that the first persona run on the first host system in the first controller environment provided by the first controller of the plurality of controllers should be booted on a second host system in a second controller environment provided by a second controller of the plurality of controllers;

retrieving, by the controller manager, the first persona from the persona storage device that is coupled to the controller manager and that stores the plurality of personas; and booting, by the controller manager, the first persona that was retrieved from the persona storage device on the second host system in order to run the first persona on the second host system;

receiving, by the controller manager, a first change object from at least one of the plurality of controllers, wherein the first change object includes a modification to the first persona run on the second host system;

applying, by the controller manager, the modification to the first persona to provide a second persona; and replacing, by the controller manager, the first persona in the persona storage device with the second persona.

14. The method of claim 13, wherein the monitoring of the respective controller environment provided by each of the plurality of controllers includes monitoring state changes in each respective controller environment.

15. The method of claim 13, further comprising:

detecting, by the controller manager, a failure of a third controller of the plurality of controllers that provides a third controller environment in a first system control network that is coupled to the third controller;

providing, by the controller manager, the personas associated with the third controller environment on the persona storage device; and booting, by the controller manager from the persona storage device on a second system control network, the personas associated with the third controller environment in order to redeploy the third controller environment on a fourth controller of the plurality of controllers.

16. The method of claim 13, further comprising:

detecting, by the controller manager, a failure of a failed persona run on a third host system in the first controller environment provided by the first controller of the plurality of controllers;

identifying, by the controller manager, the failed persona in the persona storage device; and using, by the controller manager, the failed persona from the failed persona identified in the persona storage device to restart the failed persona on a fourth IHS in the second controller environment provided by the second controller of the plurality of controllers.

17. The method of claim 13, further comprising:

stopping, by the controller manager, the first persona run on the first host system before the first persona is booted on the second host system.

* * * * *